(12) United States Patent
Yagi et al.

(10) Patent No.: US 6,393,429 B1
(45) Date of Patent: May 21, 2002

(54) FILE HANDLING DEVICE, AND A RECORDING MEDIUM STORING A FILE HANDLING PROGRAM

(75) Inventors: Takao Yagi; Osamu Takahashi, both of Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/229,328

(22) Filed: Jan. 13, 1999

(30) Foreign Application Priority Data

Aug. 10, 1998 (JP) .......................................... 10-225811

(51) Int. Cl.$^7$ ................................................ G06F 17/00
(52) U.S. Cl. ........................ 707/102; 707/100; 707/104
(58) Field of Search ................................. 345/356, 346, 345/348, 467, 357, 358; 707/4, 100, 102, 104; 705/14, 513

(56) References Cited

U.S. PATENT DOCUMENTS

| | | | | |
|---|---|---|---|---|
| 5,668,966 A | * | 9/1997 | Ono et al. ................... | 345/356 |
| 5,761,656 A | * | 6/1998 | Ben-Shachar .................. | 707/4 |
| 5,801,702 A | * | 9/1998 | Dolan et al. ................. | 345/357 |
| 5,933,143 A | * | 8/1999 | Kobayashi ................... | 345/346 |
| 5,966,126 A | * | 10/1999 | Szabo ........................ | 345/348 |
| 6,043,826 A | * | 3/2000 | Manning ..................... | 345/467 |
| 6,053,951 A | * | 4/2000 | McDonald et al. ............ | 717/1 |
| 6,061,659 A | * | 5/2000 | Murray ....................... | 705/14 |
| 6,061,695 A | * | 5/2000 | Slivka et al. ............... | 705/513 |
| 6,181,344 B1 | * | 1/2001 | Tarpenning et al. ........ | 345/358 |

* cited by examiner

*Primary Examiner*—Thomas Black
*Assistant Examiner*—Thuy Pardo
(74) *Attorney, Agent, or Firm*—Staas & Halsey LLP

(57) ABSTRACT

A file handling device designed to improve the efficiency of file selection in a GUI environment. When a menu is opened with a file, a folder or an icon selected in a file menu, a file selection screen, a folder tree menu or a file browser or with an icon on the desktop selected, file menu item creation/display unit, file selection screen item creation/display means, folder tree item creation/display unit and file/icon menu item creation/display unit read out data set by means of environment setting unit and stored in settings storing unit, as well as history data stored in history storing unit, and additionally display the read data in the menu or the like. At the time of drag-and-drop operation, drop list window creation/display unit reads out the set data and the history data and displays a list of the read data in a drop list window.

20 Claims, 25 Drawing Sheets

FIG. 4(A)

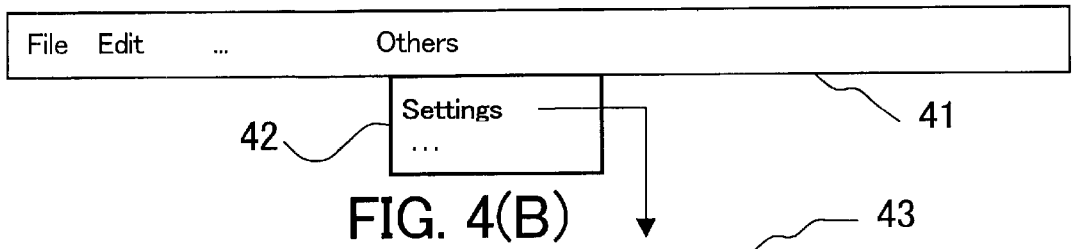

FIG. 4(B)

Settings

| Display Item Settings | Drag & Drop Settings | | 45 | 44 |

| File Menu | Folder Tree | Drop List Window |

☐ Display menu    ☐ Display recently accessed files   No. of display items: 4

☐ Display recently accessed folders   No. of display items:

☐ Display specified files   No. of display items: 4

☐ Display specified folders   No. of display items: 4

Specify files to be displayed:

| File Name | File Type |   |
|-----------|-----------|---|
| File 1    | Data        | ▲ |
| File 2    | Application |   |
| File 3    | Data        |   |
| File 4    | Data        | ▼ |

[ Add ]   [ Delete ]

[ Move Up in Order ]
[ Move Down in Order ]
[ Sort ]

Specify folders to be displayed:

| Folder Name | Folder Type |   |
|-------------|-------------|---|
| Folder 1    | Local       | ▲ |
| Folder 2    | Local       |   |
| Folder 3    | Network     |   |
|             |             | ▼ |

[ Add ]   [ Delete ]

[ Move Up in Order ]
[ Move Down in Order ]
[ Sort ]

FILE HANDLING DEVICE, AND A RECORDING MEDIUM STORING A FILE HANDLING PROGRAM

BACKGROUND OF THE INVENTION (1) Field of the Invention

The present invention relates to a file handling device, and more particularly, to a file handling device capable of improving the efficiency of manipulation on a file menu of an application, a menu of a file browser such as Explorer, and a menu of an icon on the desktop, the drag-and-drop operation on the file browser, etc. during handling of files in a GUI (Graphical User Interface) environment, that is, during selection of a file to be opened in an application, selection of a location to which a file is to be copied, and selection of an application in which a file is to be opened.

(2) Description of the Related Art

In GUI environments, files are handled basically with the use of a mouse, and almost all operations except for the entry of characters, such as the selection of a data file to be opened from within an application and the operation of selecting, copying or moving files listed in a file browser, can be performed with the mouse.

In an operating system based on a GUI environment, for example, in Windows (trademark of Microsoft Corporation, U. S. A., registered in the United States and other countries), file handling described below is available.

Clicking "File" in the menu bar of an application which is already started opens a file menu. The file menu displays, in addition to items such as "New" and "Open", a list of recently accessed files, and by specifying a file item in the list, it is possible to select with ease a file to be opened. The number of items to be displayed in the list of recently accessed files is set beforehand. Each time a file that is not on the list of recently accessed files is selected, it is added to the list, and when the number of files added becomes greater than the set number of items, the oldest item is removed from the list so that only the latest file items may always be displayed.

Also, right-clicking the mouse with a file selected in a file browser or with an icon on the desktop selected opens a menu including the item "Open". By selecting the item "Open", it is possible to start the selected application or to open the selected file with its associated application started.

If the item "Open" is selected in the file menu which has been opened by clicking "File" in the menu bar, a file selection screen is displayed. The file selection screen displays, in the case, the contents of the last accessed folder (i.e., directory). If a target file exists in the current folder, it can be opened by specifying the corresponding file item and then double-clicking the item or pressing the "Open" button. If the target file does not exist in the current folder, a "Select Folder (Select Directory)" button is pressed and a folder including the target file is selected in a folder selection screen to switch to that folder, so that the target file can be selected.

Selecting the item "Open" in the file menu which has been opened by clicking "File" in the menu bar displays the file selection screen, and this file selection screen shows the contents of the last accessed folder, as mentioned above. If, in this case, a target file does not exist in the current folder, a "Browse" button is pressed to display a folder tree screen, and a folder including the target file is selected in the screen to switch to that folder, so that the target file can be selected.

Further, a file selected in the file browser may be dragged and dropped onto an application which is already started, an icon of an application or folder on the desktop, or an icon of an application file or folder displayed in the file browser, all visibly shown on the screen. By dropping the selected file onto an icon of an application, it is possible to start the application and open the dragged file. Also, dropping the selected file onto an icon representing a folder permits the dragged file to be copied/moved to that folder.

In cases where a target file is not on the list of recently accessed files in the file menu which has been opened by clicking "File" in the menu bar, however, the item "Open" is selected to display the file selection screen, and if the target file still does not exist in the current folder displayed in the file selection screen, double-clicking operation or the like usually needs to be performed a plurality of times in the folder selection screen, which is displayed in response to depression of the "Select Folder" button or the "Browse" button, to switch the current folder to a folder containing the target file before the target file is finally selected.

Also, where a menu is opened with a file selected in the file browser or an icon on the desktop selected, selecting the item "Open" in the menu merely starts the application represented by the selected file or icon, or starts an application associated with the file represented by the selected file or icon and then opens the file. Accordingly, in the former case, a file needs to be opened after the application is started, and in the latter case, the file cannot be opened in an application that is not associated with the file.

In the file menu which opens upon clicking "File" in the menu bar, the item "Open" is located at a position easiest to select in the menu. Since it is easier to select the item "Open" than the list of recently accessed files located at the bottom of the menu, in many cases the item "Open" is selected to open the file selection screen without the items in the list being checked. The file selection screen usually opens the last accessed folder, and therefore, if a target file exists in another folder, it is necessary that the current folder be switched to the folder containing the target file.

Also, in the drag-and-drop operation, the dragged file can be dropped only onto an application which is already started, an icon of an application or folder on the desktop, or an icon of an application file or folder displayed in the file browser, all visibly shown on the screen, regardless of the position from which the file is dragged. In general, applications and folders which a user frequently uses are presumably limited in number. However, in cases where the target of a drop operation is an application which is already started or an icon of an application file or folder displayed in the file browser, the application needs to be started beforehand, and where the target of a drop operation is an icon of an application or folder on the desktop, such an icon needs to be placed on the desktop beforehand. Icons on the desktop remain displayed even after the drop operation is completed and thus the icons are unnecessary any longer; therefore, if the number of icons displayed increases, the desktop is crowded with icons and it is also difficult to find a target icon when a dragged file is to be dropped, lowering the operation efficiency. Further, in cases where the target of a drop operation is distant from the position from which a file is dragged, the file needs to be dragged over a long distance to the position of the target of drop operation, hindering efficient drop operation. If the target of a drop operation is hidden behind another window, moreover, a problem arises in that the drop operation cannot be performed.

SUMMARY OF THE INVENTION

An object of the present invention is to provide a file handling device which eliminates the need for manipulation or reduces the number of manipulations on a file selection screen during handling of files especially in a GUI environment, to thereby facilitate the selection of a file to be opened or started or of an icon as a target of drop operation.

To achieve the above object, there is provided a file handling device permitting handling of a file/folder in an application and in a file browser and handling of an icon on a desktop. The file handling device comprises environment setting means for setting items to be displayed as menu items, settings storing means for storing contents of settings set by means of the environment setting means, history storing means for storing a history of opened files/folders, file menu item creation/display means for additionally displaying, in a file menu, items of recently accessed files/folders stored in the history storing means or items of files/folders stored in the settings storing means, file selection screen item creation/display means for additionally displaying, in a file selection screen, the items of recently accessed files/folders stored in the history storing means or the items of files/folders stored in the settings storing means, folder tree item creation/display means for additionally displaying, in a folder tree menu, the items of recently accessed files/folders stored in the history storing means or the items of files/folders stored in the settings storing means, drop list window creation/display means, responsive to a drag operation, for creating and displaying a drop list window showing, as target files/folders of drop operation, the items of recently accessed files/folders stored in the history storing means or the items of files/folders stored in the settings storing means, and file/icon menu item creation/display means for additionally displaying, in a menu which is opened in a situation where a file/folder is selected in the file browser or an icon on the desktop is selected, the items of recently accessed files/folders stored in the history storing means or the items of files/folders stored in the settings storing means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4(A) and 4(B) are diagrams showing screens displayed by a setting screen control section, wherein FIG. 4(A) shows a menu bar and FIG. 4(B) shows a display item setting screen;

FIGS. 7(A) and 7(B) are diagrams showing screens displayed by a file selection screen control section, wherein FIG. 7(A) shows a case where recently accessed files are displayed and FIG. 7(B) shows a case where all items are displayed;

FIGS. 9(A) and 9(B) are diagrams illustrating an operation performed when a "Browse" button is pressed, wherein FIG. 9(A) shows a screen displayed by the file selection screen control section and FIG. 9(B) shows a screen displayed by a folder tree screen control section;

DESCRIPTION OF THE PREFERRED EMBODIMENTS

The present invention will be outlined first with reference to the drawings.

Figure 1:
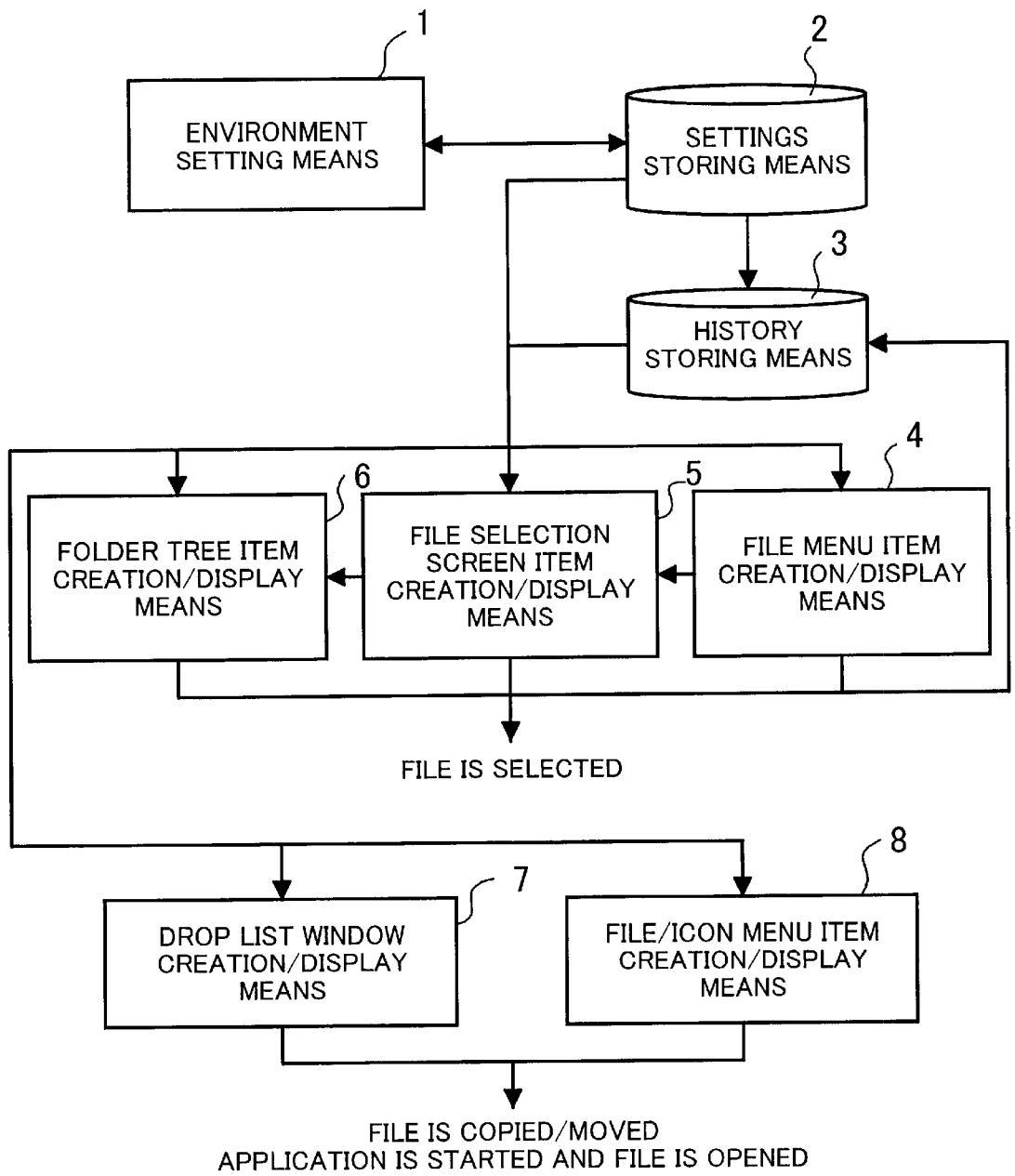
FIG. 1 is a diagram illustrating a theoretical configuration according to the present invention.

FIG. 1 shows a theoretical configuration according to the present invention. In FIG. 1, a file handling device according to the present invention comprises environment setting means 1 permitting the user to set display items, display conditions, etc., settings storing means 2 for storing the contents of settings set by means of the environment setting means 1, history storing means 3 for storing a history of opened files/folders, file menu item creation/display means 4 functioning in relation to a file menu which is manipulated for selecting a file in an application, file selection screen item creation/display means 5 functioning in relation to a file selection screen which is displayed when an item "Open" is selected in the file menu, folder tree item creation/display means 6 functioning in relation to a folder tree menu which is displayed when a "Browse" button is pressed in the file selection screen, drop list window creation/display means 7 for displaying a list of targets of a drop operation during a drag operation, and file/icon menu item creation/display means 8 functioning in relation to a menu which opens in a situation where a file/folder is selected in a file browser or an icon on a desktop is selected.

The environment setting means 1 is used to set items displayed as menu items in menus to be displayed, such as the file menu, the file selection screen, the folder tree menu, the drop list window and the file/icon menu, display conditions at drag-and-drop operation, etc., and the settings are made by the user. The contents of the settings by means of the environment setting means 1 are stored in the settings storing means 2, and are read out as needed by the file menu item creation/display means 4, the file selection screen item creation/display means 5, the folder tree item creation/display means 6, the drop list window creation/display means 7 or the file/icon menu item creation/display means 8. The history storing means 3 stores the history of opened files/folders in accordance with conditions set in the settings storing means 2 in relation to the number of display items.

When the file menu is displayed in an application, the file menu item creation/display means 4 acquires items of recently accessed files/folders from the history storing means 3 and items of prespecified files/folders from the settings storing means 2, and adds the acquired items to the file menu to be displayed. The added items each serve as an object of selection, whereby manipulation on the file selection screen can be omitted or the number of manipulations required until a target file is selected can be reduced, thus improving the operation efficiency during the selection of a file. When the file selection screen is opened as a result of the selection of the item "Open" in the file menu of an application, the file selection screen item creation/display means 5 acquires the items of recently accessed files/folders from the history storing means 3 and the items of the prespecified files/folders from the settings storing means 2, and adds the acquired items to the file selection screen to be displayed. When the file selection screen is to be opened as a result of the selection of a folder item added in the file menu of an application by the file menu item creation/display means 4, the file selection screen opens with its current folder switched to the selected folder. By selecting an added item, it is possible to reduce the number of manipulations required until a target file is selected and also the number of times the current folder is switched, whereby the efficiency of manipulation on the file selection screen and the efficiency in selecting a file can be improved. When the folder tree menu opens in response to depression of the "Browse" button in the file selection screen, the folder tree item creation/display means 6 acquires the items of recently accessed files/folders from the history storing means 3 and the items of the prespecified files/folders from the settings storing means 2, and adds the acquired items to the folder tree menu to be displayed. This improves the efficiency of manipulation on the folder tree menu as well as the efficiency in file selection. When a drag operation is started with a file/folder selected in a file browser, the drop list window creation/display means 7 acquires the items of recently accessed files/folders from the history storing means 3 and the items of the prespecified files/folders from the settings storing means 2, and displays the acquired items in the drop list window as target files/folders of a drop operation onto which the selected file/folder may be dropped. Thus, after the start of a drag operation, the drop list window showing items onto which the selected file/folder may be dropped is displayed, whereby the efficiency of the drag-and-drop operation is improved. When a menu is displayed in a situation where a file/folder is selected in the file browser or an icon on the desktop is selected, the file/icon menu item creation/display means 8 acquires the items of recently accessed files/folders from the history storing means 3 and the items of the prespecified files/folders from the settings storing means 2, and additionally displays the acquired items in the menu which opens in the situation where a file/folder is selected in the file browser or an icon on the desktop is selected. By selecting an added folder item, it is possible to improve the efficiency in copying/moving a selected folder to one of the recently accessed folders and the prespecified folders, the efficiency in opening a recently accessed file or a prespecified file with a selected application file started, and the efficiency in opening a selected file with a prespecified application started.

An embodiment of the present invention will now be described on the assumption that the invention is applied to Windows as an operating system based on a GUI environment, by way of example.

Figure 2:
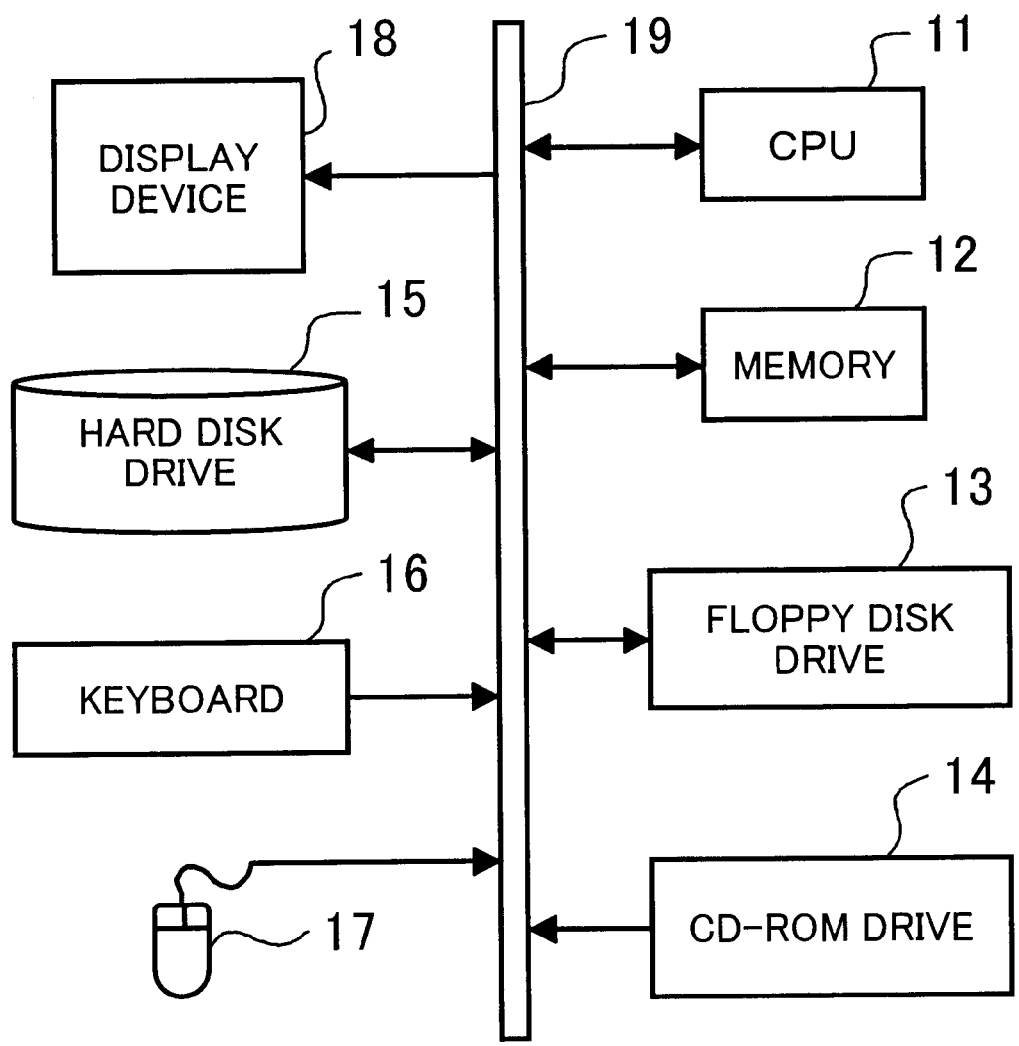
FIG. 2 is a block diagram showing, by way of example, the configuration of a computer system which functions as a file handling device.

FIG. 2 shows an example of configuration of a computer system which functions as the file handling device. The computer system comprises a central processing unit (CPU) 11, a memory 12, a floppy disk drive 13, a CD-ROM (Compact Disk Read Only Memory) drive 14, a hard disk drive 15, a keyboard 16, a mouse 17, and a display device 18. The central processing unit 11, the memory 12, the floppy disk drive 13, the CD-ROM drive 14, the hard disk drive 15, the keyboard 16, the mouse 17 and the display device 18 are interconnected by a system bus 19.

The hard disk drive 15 stores an operating system, application programs, and a file handling program according to which the computer system functions as the file handling device. The file handling program is read out from the hard disk drive 15, loaded in the memory 12, and executed by the central processing unit 11.

The system configuration of the file handling device will be now described.

Figure 3:
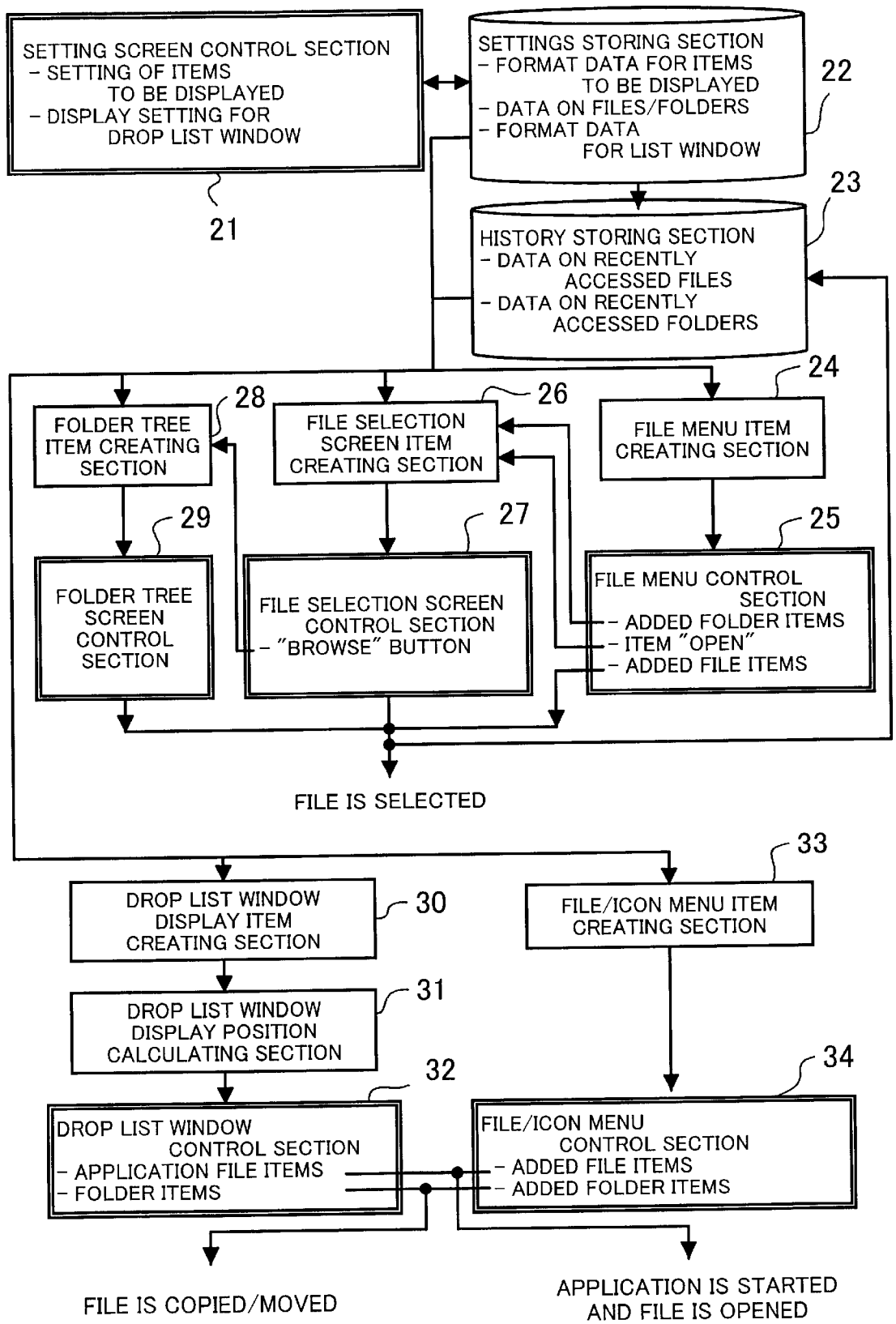
FIG. 3 is a diagram showing the system configuration of the file handling device.

FIG. 3 shows the system configuration of the file handling device. In the figure, elements enclosed by a rectangle represent logical devices each comprising a program having no screen, elements enclosed by a double line represent logical devices each comprising a program having a screen on which the user manipulates, and elements indicated by a cylindrical sign represent storage devices including a physical area, such as the hard disk drive 15 or the memory 12. A setting screen control section 21 constitutes a screen for the setting of a variety of items for operating the file handling device and permits the setting of items (files, folders) to be displayed and the display setting for the drop list window. The setting screen control section 21 is connected to a settings storing section 22, and the contents of the settings by means of the setting screen control section 21 are stored in the settings storing section 22. At the time of setting, the contents of the settings previously stored in the settings storing section 22 are read out and reflected in the screen. The settings storing section 22 stores format data for items to be displayed, data on files/folders, and format data for the list window, all set by means of the setting screen control section 21.

The settings storing section 22 is connected to a history storing section 23. The history storing section 23 is provided to store a history of recently used files and folders, and stores data on recently accessed files and folders corresponding in number to the set display items stored in the settings storing section 22. If the number of display items are exceeded because a newly accessed file/folder does not coincide with any of the recently accessed file/folder items stored in the history storing section 23, the oldest history data is removed while the newly accessed file/folder item is added, and the updated history is stored in the history storing section 23.

A file menu item creating section 24 receives necessary data from the settings storing section 22 and the history storing section 23 when the file menu is to be displayed and manipulated, and the output thereof is connected to a file menu control section 25. The file menu control section 25 includes, as menu items, at least added folder items, an item "Open", and added file items. The added folder items and the item "Open" are associated with a file selection screen item creating section 26 such that when any one of these items is selected, the section 26 is called. When any one of the added file items is selected, no special process is executed and the corresponding file is opened.

The file selection screen item creating section 26 receives necessary data from the settings storing section 22 and the history storing section 23 when called by the file menu control section 25, and the output thereof is connected to a file selection screen control section 27. The file selection screen control section 27 includes a "Browse" button. The "Browse" button is associated so as to call a folder tree item creating section 28. When an operation other than the depression of the "Browse" button is performed, a file is opened.

The folder tree item creating section 28 receives necessary data from the settings storing section 22 and the history storing section 23 when called by the file selection screen control section 27, and the output thereof is connected to a folder tree screen control section 29. When a file is finally selected at the folder tree screen control section 29, it is opened.

A drop list window display item creating section 30 receives necessary data from the settings storing section 22 and the history storing section 23 when a drag operation is started on the desktop or on the file browser, and the output thereof is connected via a drop list window display position calculating section 31 to a drop list window control section 32. The drop list window control section 32 includes application file items and folder items. When a dragged file is dropped onto an application file item, an application represented by the application file item is started and the dragged file is opened. When a dragged file is dropped onto a folder item, the dragged file is copied/moved to a folder represented by the folder item.

When the file/icon menu is to be opened in a situation where a file/folder is selected in the file browser or an icon on the desktop is selected, a file/icon menu item creating section 33 receives necessary data from the settings storing section 22 and the history storing section 23, and the output thereof is connected to a file/icon menu control section 34. The file/icon menu control section 34 includes added file items and added folder items. If an added file item is specified, the corresponding file is opened with its associated application started, and if an added folder item is selected, the file is copied/moved to the selected folder.

Examples of how screens are constructed by the respective control sections will be now described in order.

FIGS. 4(A) and 4(B) show screens displayed by the setting screen control section, wherein FIG. 4(A) shows a menu bar and FIG. 4(B) shows a display item setting screen. As shown in FIG. 4(A), an application is provided with a menu bar 41 for performing various operations, and left-clicking an item "Others" shown in the menu bar 41 displays a menu 42 near the clicked position. If an item "Settings" is selected in the menu 42, a setting screen 43 shown in FIG. 4(B) is displayed. The setting screen 43 is provided with a display item setting screen 44 and a drag-and-drop setting screen 45.

The display item setting screen 44 is provided, for each of the file menu, the folder tree and the drop list window, with an entry field for the display/non-display switching of the file menu, the folder tree or the drop list window (entry field for specifying whether to display the corresponding one of the file menu, the folder tree and the drop list window), entry fields for the display/non-display switching of recently accessed files/folders and files/folders set by the user, and entry fields for the numbers of display items for specifying how many recently accessed files/folders and set files/folders are to be displayed. Below "Specify files to be displayed:" is located an entry screen for adding file names to be set, and below "Specify folders to be displayed:" is located an entry screen for adding folder names to be set. These entry screens are also provided with buttons for setting the order of priority of the items.

Thus, the display item setting screen 44 permits the user to customize the display/non-display setting of individual items, the setting of the numbers of items to be displayed, and the setting of the order of priority of items in accordance with the environment and usage of the user.

Clicking the "Drag & Drop Settings" tab in the setting screen switches the screen to the drag-and-drop setting screen 45.

Figure 5:
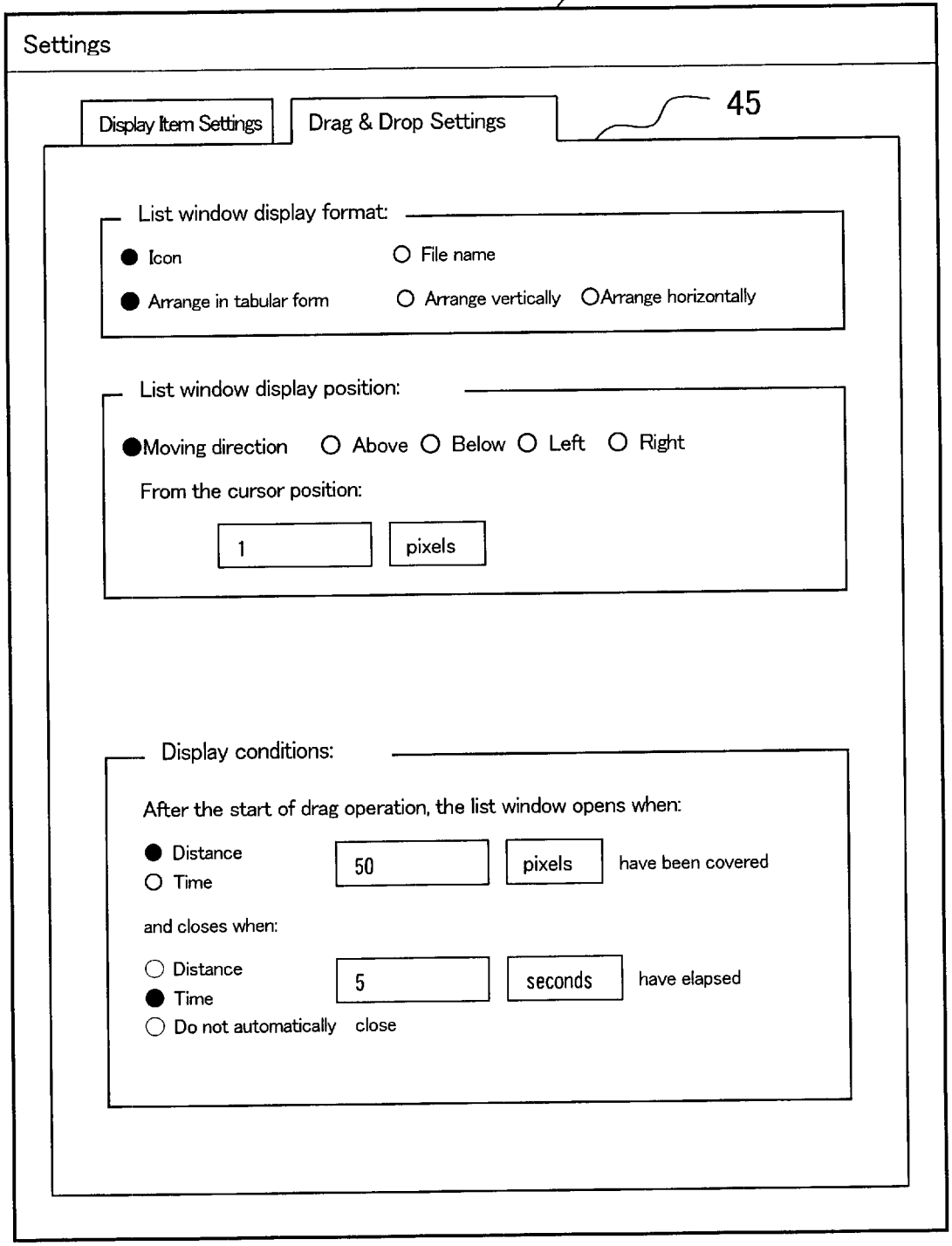
FIG. 5 is a diagram showing a drag-and-drop setting screen displayed by the setting screen control section.

FIG. 5 shows the drag-and-drop setting screen displayed by the setting screen control section. The drag-and-drop setting screen 45 is a screen which permits the user to set conditions for displaying the list window at the time of drag-and-drop operation, and is provided with screens for setting the display format, display position and display conditions for the list window.

"List Window Display Format" allows the user to specify whether icons or file names are to be shown as display formats when the drop list window is displayed, whether the icons/file names are to be arranged in tabular form, and if the icons/file names are to be arranged in tabular form, whether the icons/file names are to be arranged vertically or horizontally.

In "List Window Display Position", the user can specify whether the drop list window is to be displayed in the moving direction of the mouse cursor, above, below, to the left or to the right of the mouse cursor position, and also can specify by the number of pixels how far the drop list window is to be displayed from the mouse cursor position.

"Display Conditions" permits the user to set, by the distance of movement or by time, conditions for causing the drop list window to appear and disappear from the start of drag operation. Distance can be set by the number of pixels and time can be set in seconds.

Thus, the user can customize the drop list window to be displayed in accordance with the environment and usage, and also can set the drop list window so that the displayed window may automatically disappear in case no drop operation is actually performed.

The display items and the display conditions set in the display item setting screen 44 and the drag-and-drop setting screen 45 are stored in the settings storing section 22. The numbers of display items set in the display item setting screen 44 define the numbers of files and folders to be kept in history in the history storing section 23.

The file menu control section 25 has a screen described below, for example.

Figure 6:
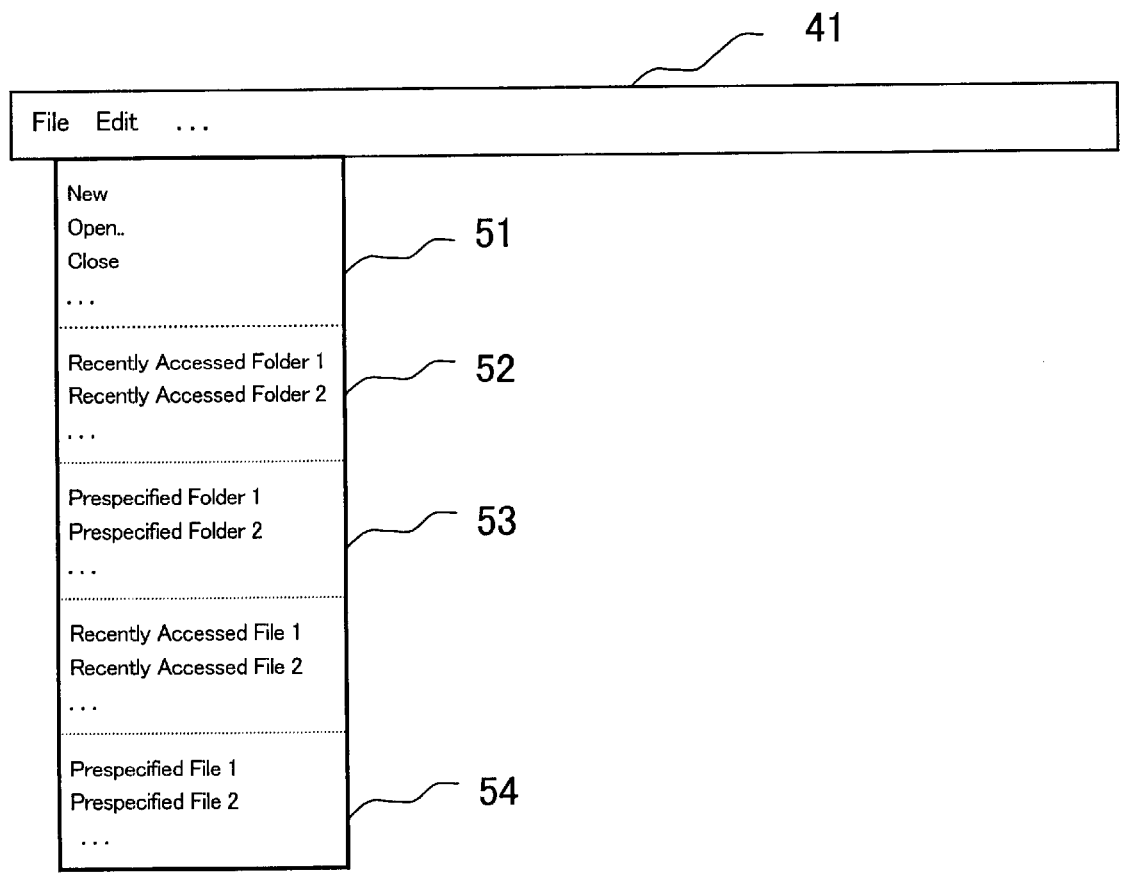
FIG. 6 is a diagram showing a screen displayed by a file menu control section.

FIG. 6 shows a screen displayed by the file menu control section. Clicking "File" on the menu bar 41 of an application displays a file menu 51. In this case, the file menu 51 additionally displays a list 52 of recently accessed folders, a list 53 of folders prespecified by the settings, and a list 54 of files prespecified by the settings, all created by the file menu item creating section 24. The illustrated example of the file menu 51 shows a case where the display item setting screen 44 in FIG. 4 has been set such that all file/folder items are to be displayed. Where any of the items are set so as not to be displayed, the file menu shows files/folders according to such settings.

The list 52 of recently accessed folders in the file menu 51 shows a list of folders recently accessed by the application concerned, the list 53 of prespecified folders shows a list of the folders set by the user, and the list 54 of prespecified files shows a list of the files set by the user.

Thus, when the file menu 51 is opened, recently accessed files/folders and the files/folders set by the user are displayed in the form of list, whereby files/folders which are used frequently can be selected with high efficiency.

By selecting a file prespecified by the settings or a recently accessed file, it is possible to open the file. When a recently accessed folder or a folder prespecified by the settings is selected, the file selection screen opens. The file selection screen displayed in this case is the same as that which opens when the item "Open" is selected in the file menu 51, but the current folder then displayed is the selected folder which was recently accessed or prespecified by the settings. It is therefore unnecessary to switch the current folder to a folder containing a target file, unlike the case where the item "Open" is simply selected.

When the item "Open" is selected, a recently accessed folder or a folder prespecified by the settings is selected in the file menu 51, the file selection screen opens, and an example of the file selection screen will now be described.

Figure 7A:
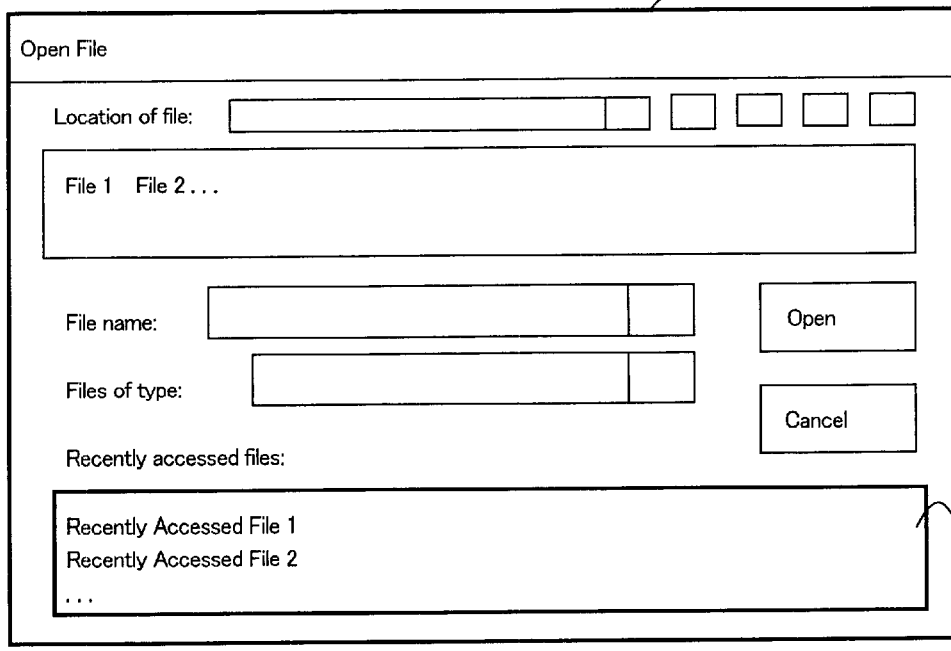
Figure 7B:
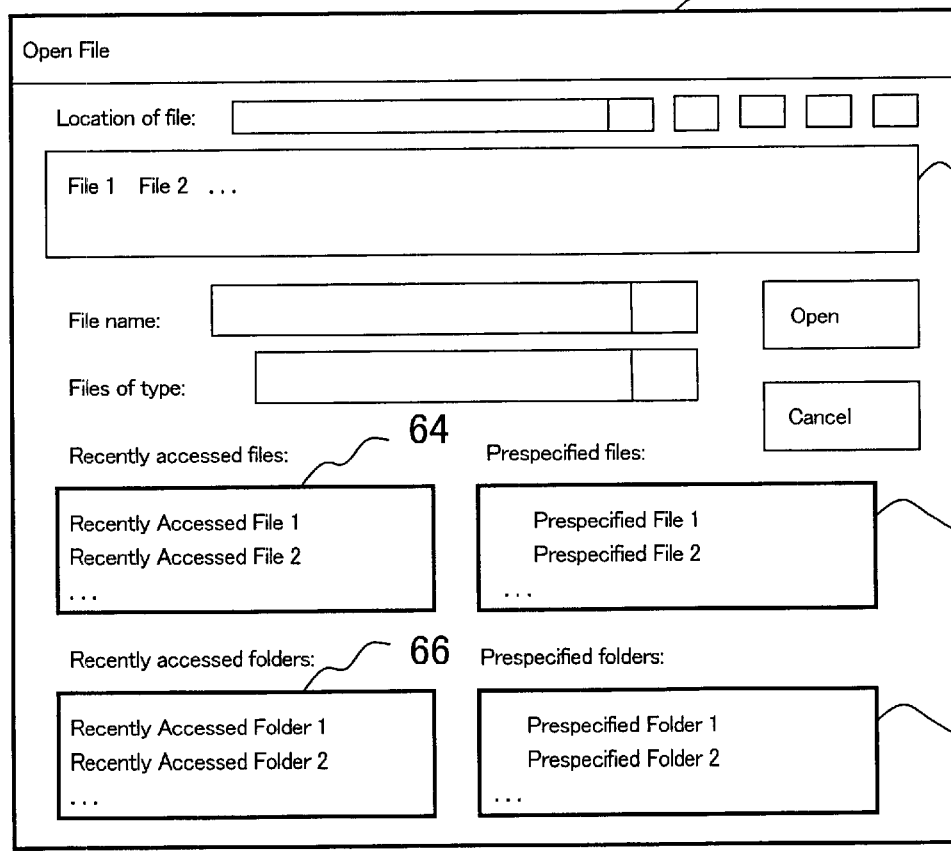

FIGS. 7(A) and 7(B) show screens displayed by the file selection screen control section, wherein FIG. 7(A) illustrates a case where recently accessed files are displayed and FIG. 7(B) illustrates a case where all items are displayed. A file selection screen 61 shown in FIG. 7(A) is the screen which is displayed when settings have been made in the display item setting screen 44 of the setting screen 43 such that only recently accessed files should be displayed. This file selection screen 61 includes a "Location of file:" field showing a current folder, a list box showing a list of files contained in the folder, a "File name:" field in which the name of a file to be opened is entered, a "Files of type:" field for specifying the type of files to be listed in the list box, and also a "Recently accessed files:" list box 62 located at the bottom of the screen and showing recently accessed files which have been set to be displayed in the display item setting screen 44.

The "Recently accessed files:" list box 62 is created by the file selection screen item creating section 26 and is additionally displayed in the file selection screen 61.

In cases where settings have been made in the display item setting screen 44 such that recently accessed files, the files prespecified by the settings, recently accessed folders and the folders prespecified by the settings should be displayed, corresponding list boxes 64, 65, 66 and 67 are additionally shown in a file selection screen 63 as shown in FIG. 7(B).

When a file listed in the list box 64 or 65 is selected, the name thereof appears in the "File name:" field, and the file can be opened by pressing the "Open" button. When a folder listed in the list box 66 or 67 is selected, on the other hand, the current folder displayed in the file selection screen 63 is switched to the selected folder with the selected folder name shown in the "Location of file:" field, and a list of files contained in this folder is shown in the list box 68. By selecting a file in the list box 68 and pressing the "Open" button, it is possible to open the file.

Thus, when the file selection screen 63 opens, it shows a list of recently accessed files and the files set by the user, and accordingly, frequently used files can be selected with high efficiency. Even in the case where a target file does not exist in the folder displayed by the file selection screen 63, folders can be easily switched because a list of recently accessed folders and the folders set by the user, which are frequently used, is displayed.

Figure 8:
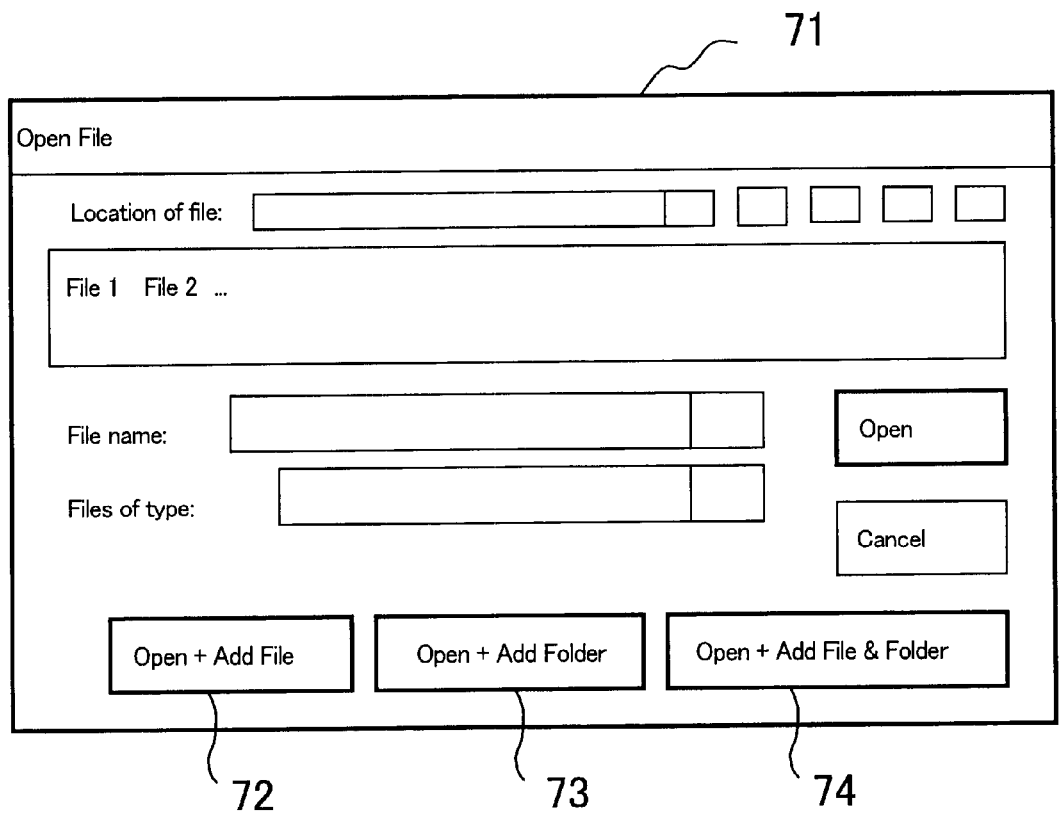
FIG. 8 is a diagram showing another screen displayed by the file selection screen control section.

FIG. 8 shows another screen displayed by the file selection screen control section. A file selection screen 71 which is displayed when the item "Open" is selected in the file menu includes a "Location of file:" field showing a current folder, a list box showing a list of files contained in the folder, a "File name:" field in which the name of a file to be opened is entered, a "Files of type:" field for specifying the type of files to be listed in the list box, an "Open" button for opening a file of which the name has been entered in the "File name:" field, and a "Cancel" button. The file selection screen 71 additionally includes an "Open+Add File" button 72, an "Open+Add Folder" button 73, and an "Open+Add File & Folder" button 74.

Usually, a file of which the name has been entered in the "File name:" field can be opened by pressing the "Open" button. In this case, the "Open+Add File" button 72 may be pressed instead of the "Open" button, whereupon the file is opened with data on the file added to the list of recently accessed files in the history storing section 23. Pressing the "Open+Add Folder" button 73 opens the file with data on the folder added to the list of recently accessed folders in the history storing section 23, and pressing the "Open+Add File & Folder" button 74 opens the file with data on the file and folder added to the respective lists of recently accessed files and folders stored in the history storing section 23. In this manner, when a selected file is opened, data thereon can be positively added to the applicable list of the history storing section 23 as recently accessed file/folder data. This is useful because the user very often makes a decision whether a file is to be displayed in the file menu in the course of actual work, and the above buttons permit the user to specify files/folders that should be kept in history to be displayed when a file is opened.

In the example shown in FIG. 8, when the "Open+Add File" button 72, the "Open+Add Folder" button 73 or the "Open+Add File & Folder" button 74 is pressed, data on the file/folder is added to the list(s) of recently accessed files/folders in the history storing section 23. Alternatively, the user may be allowed the option to selectively specify the list of recently accessed files/folders or the list of the files/folders prespecified by the settings.

Some file selection screens include a "Browse" button to facilitate the locating of a target folder, and the following describes a folder tree screen displayed when the "Browse" button is pressed.

Figure 9A:
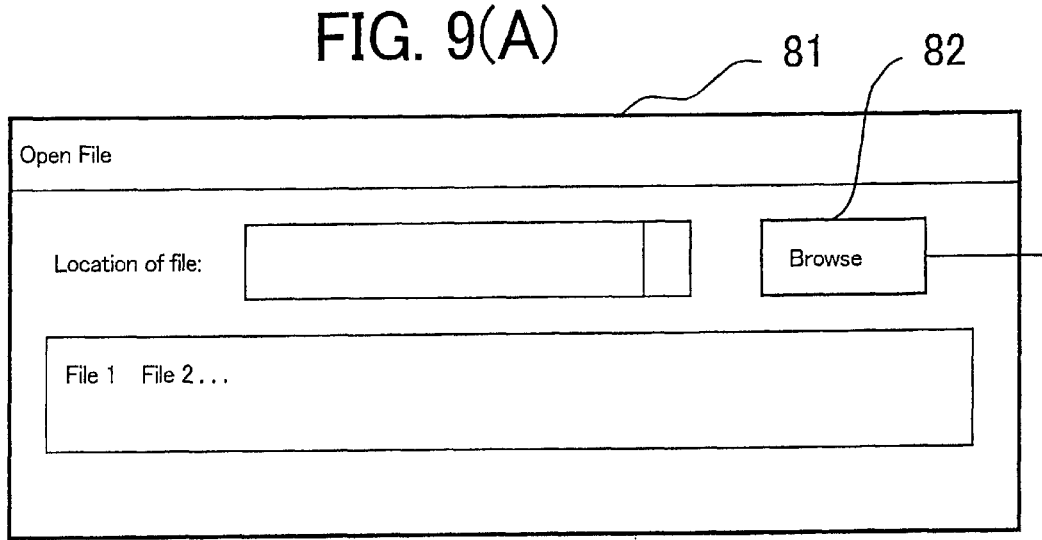
Figure 9B:
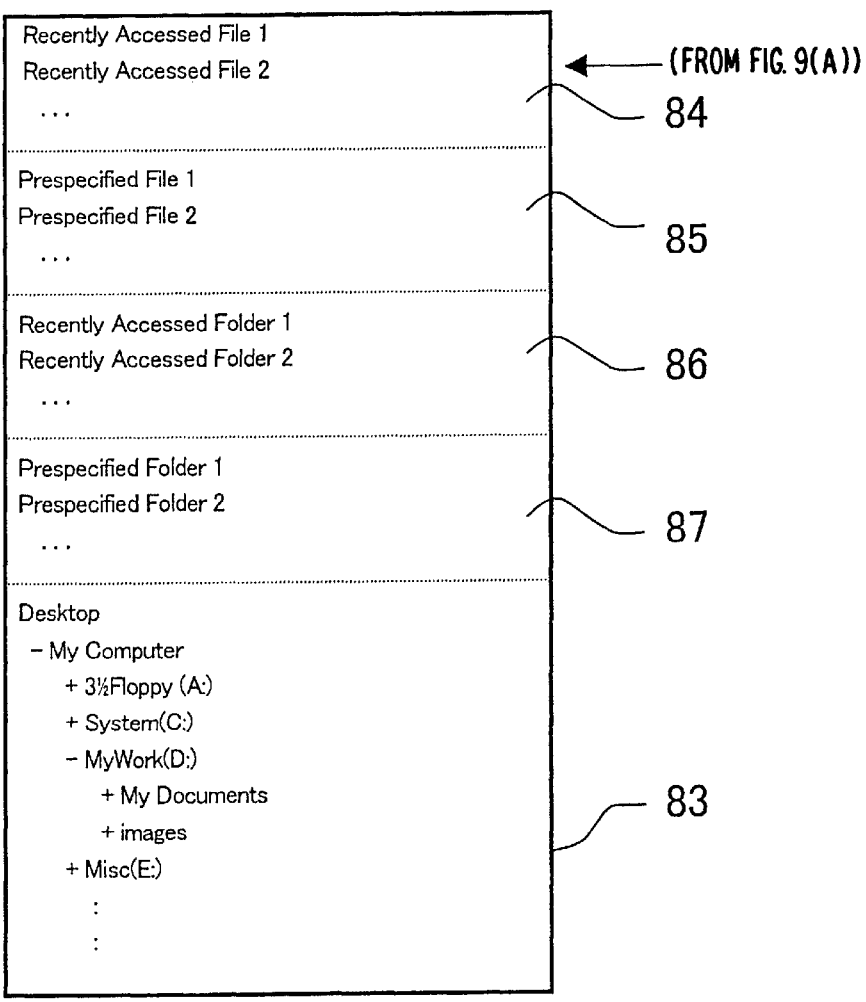

FIGS. 9(A) and 9(B) illustrate the operation performed when the "Browse" button is pressed, wherein FIG. 9(A) shows a screen displayed by the file selection screen control section and FIG. 9(B) shows a screen displayed by the folder tree screen control section. As shown in FIG. 9(A), a file selection screen 81 displayed when the item "Open" is selected in the file menu includes a "Browse" button 82, in addition to the "Location of file:" field showing a current folder and the list box showing a list of files contained in the folder. When the "Browse" button 82 is pressed, the folder tree item creating section 28 is started. The folder tree item creating section 28 creates folder tree items in accordance with the display conditions set in the display item setting screen 44 of the setting screen 43, and the folder tree screen control section 29 displays a folder tree screen 83 as shown in FIG. 9(B). The folder tree screen 83 displays, in addition to ordinary folder tree information, a list 84 of recently accessed files, a list 85 of files prespecified by the settings, a list 86 of recently accessed folders, and a list 87 of folders prespecified by the settings.

By selecting from the folder tree screen 83 a recently accessed file or a file prespecified by the settings, it is possible to directly open the file. When a recently accessed folder or a folder prespecified by the settings is selected in the folder tree screen 83, the current folder of the file selection screen 81 shown in FIG. 9(A) switches to the selected folder.

Thus, when the folder tree screen 83 opens, it shows the lists of recently accessed files/folders and the user-specified files/folders, and therefore, it is unnecessary to manipulate the folder tree a plurality of times until a folder containing a target file is located, permitting efficient selection of frequently used files/folders.

A drop target list window which is displayed at the time of drag-and-drop operation will be now described. By selecting a file/folder displayed in a file browser such as "Explorer" or an icon on the desktop, then moving (dragging) the selected object to another file, folder or icon with the mouse button held down, and releasing the mouse button (dropping the selected object), it is possible to copy/move the file/folder or to open the file with the application started. In this case, a file, folder or icon onto which the selected object is to be dropped must be visible on the screen. A window is therefore created and displayed which lists the files (application files)/folders set by the user as well as recently accessed folders in icon/label format and which permits the drop operation. An example of the window displayed on the screen will be described below. Since a file/folder is dragged on the file browser in the same manner as in dragging an icon on the desktop, in the following a drag operation of a file/folder on the file browser will be explained.

Figure 10:
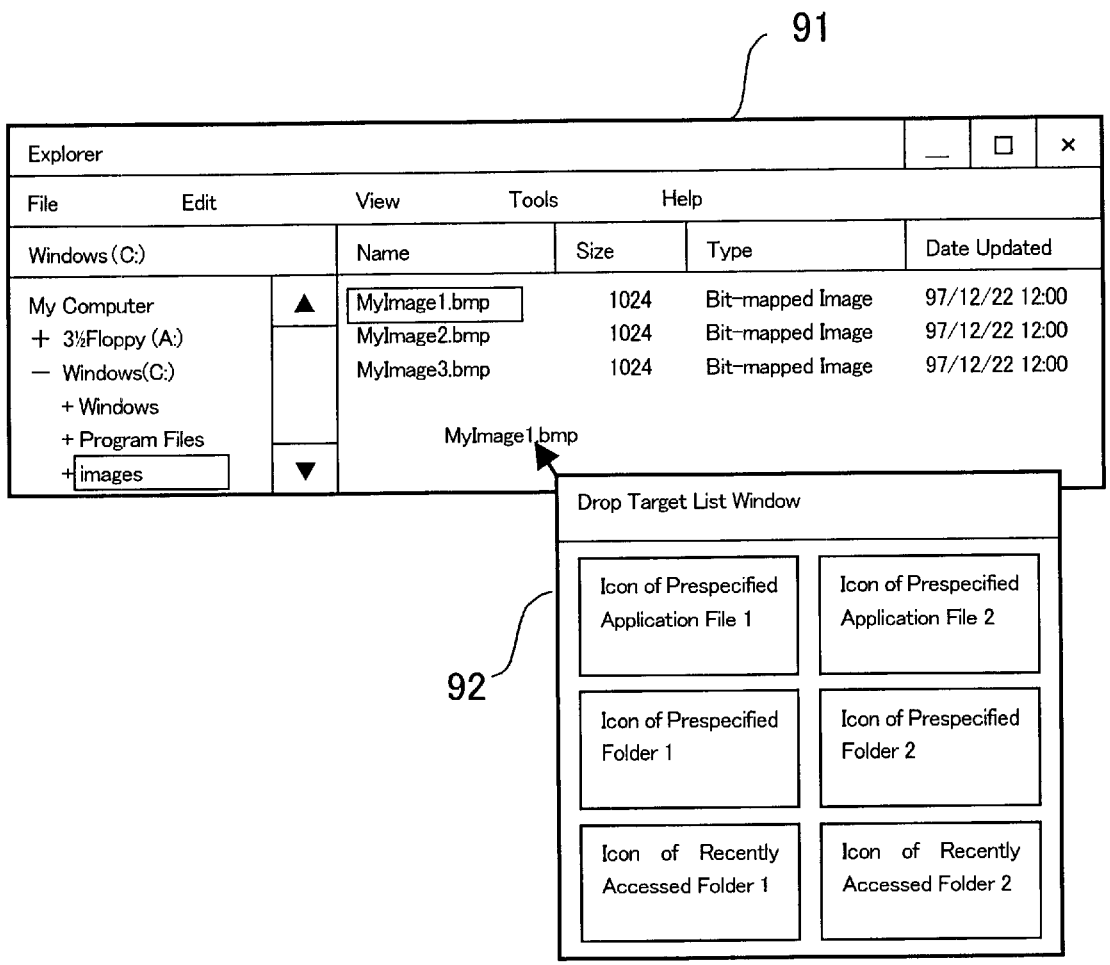
FIG. 10 is a diagram showing a screen displayed by a drop list window control section when a drag operation is performed.

FIG. 10 shows a screen which is displayed by the drop list window control section at the time of drag operation. In FIG. 10 is shown a file browser 91. Let it be assumed that the folder "images" is selected and drag operation is started with the file "MyImage1.bmp" specified, then a drop target list window 92 is displayed as a foreground window in the vicinity of the position where the drag operation has been started. The drop target list window 92 is displayed in accordance with the display conditions set in the drag-and-drop setting screen 45. If the drag-and-drop setting screen 45 has been set as shown in FIG. 5, for example, the drop target list window 92 is displayed at a distance of 50 pixels in the moving direction of the mouse cursor and at a distance of one pixel from the mouser cursor, and shows icons as display objects in tabular form. When drag operation is started, displacements of the mouse in the X- and Y-axis directions are detected, and based on a position separated by the distance calculated from the magnitudes of the detected displacements, a position in the vicinity of the position where the drag operation has been started is determined. This calculation is performed by the drop list window display position calculating section 31. The drop target list window 92 shows, for example, the icons of "Application File 1", "Application File 2", "Folder 1" and "Folder 2" prespecified by the settings, and the icons of "Folder 1" and "Folder 2" recently accessed. These icons are prepared by the drop list window display item creating section 30.

By continuously dragging a file and then dropping it onto an icon of an application prespecified by the settings, it is possible to open the dragged file in the application represented by the icon onto which the file has been dropped. Where the icon onto which the file is dropped is a folder prespecified by the settings or a recently accessed folder, the dragged file can be copied/moved to the folder represented by the icon onto which the file has been dropped. Whether a copy or move operation is performed is governed by general manipulations defined in the environment concerned. For example, if a file is dropped with the "Ctrl" key held down, the file is copied, and if a file is dropped without the "Ctrl" key being depressed, the file is moved.

The items displayed in the drop target list window 92 are switched depending on the object to be dragged. Specifically, if the dragged object is a single or a plurality of data files, applications and folders are selected as display items to be listed. On the other hand, if the dragged object is a single or a plurality of application files, a combination of an application file and a data file, or a combination of a single or a plurality of folders and a single or a plurality of files, folders are selected as display items to be listed. In the example shown in FIG. 10, applications and folders are displayed in the drop target list window 92 because the dragged object is a data file containing a bit-mapped image.

Thus, at the time of drag operation, the drop target list window 92 showing the lists of the user-specified files (application files)/folders and recently accessed folders in icon/label format and permitting drop operation is displayed as a foreground window at an optimum position in the vicinity of the mouse cursor position. By dropping the dragged file onto an item representing an application, it is possible to start the application represented by the item and then open the file therein, and by dropping the dragged file onto an item representing a folder, it is possible to copy/move the file to the folder. Accordingly, drag-and-drop operation can always be performed with a minimum number of manipulations regardless of the position where the drag operation has been started, whereby the efficiency of drag-and-drop operation is improved. Since it is unnecessary to place application/folder icons that the user desires to use in advance on the desktop, it is possible to minimize the number of icons displayed uselessly and thus to prevent the desktop from being crowded with icons. Further, a list of suggested drop targets registered beforehand is displayed in advance of drop operation as a foreground window, and this permits drop operation to be performed even when many windows are displayed on the screen.

A menu which opens in a situation where a file/folder is selected in the file browser or an icon on the desktop is selected will now be described. The menu which opens while a file/folder is selected in the file browser is the same as that which opens while an icon on the desktop is selected, and therefore, in the following description, the former menu will be taken as an example.

Figure 11:
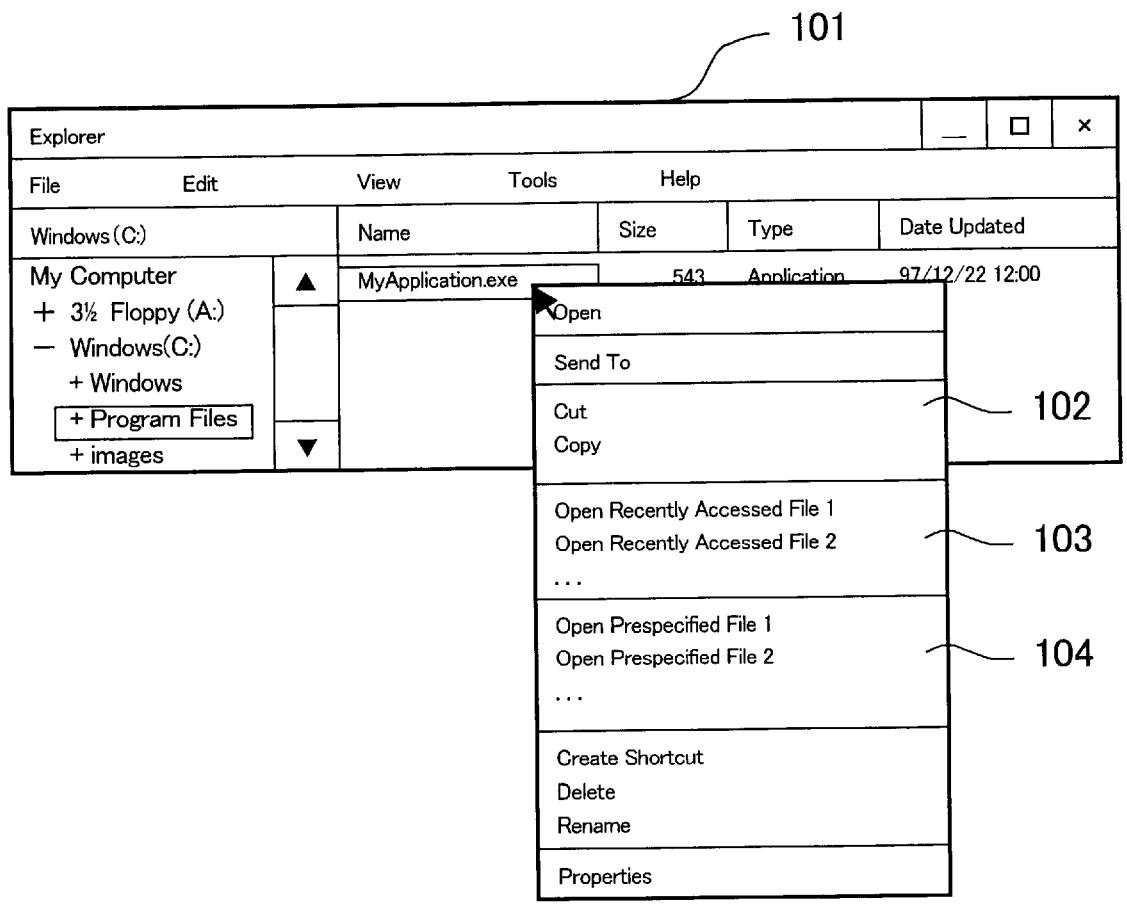
FIG. 11 is a diagram showing a first screen displayed by a file/icon menu control section.

FIG. 11 shows a first screen displayed by the file/icon menu control section. In FIG. 11, a file browser 101 is shown, and with a "Program Files" folder selected, "MyApplication.exe", which is a single application file, is selected and then right-clicked or "MyApplication.exe" is directly right-clicked, whereupon a menu 102 opens. This menu 102 additionally displays an "Open Recently Accessed File" list 103 and an "Open Prespecified File" list 104, both created by the file/icon menu item creating section 33. The added menu items are also shown in the menu which appears when an icon of a single application file on the desktop or in the browser or a shortcut icon on the desktop is selected and right-clicked.

By selecting a recently accessed file or prespecified file from the menu 102, it is possible to open the file in the previously selected application. Thus, unlike the conventional menu which merely starts the application when the item "Open" is selected therein, the menu 102 permits an operation such that when a file is selected therein, the selected file is automatically opened with the application started. Since recently used files and the files prespecified by the user are shown in the "Open Recently Accessed File" list 103 and the "Open Prespecified File" list 104, respectively, frequently used files can be quickly opened in the selected application. Thus, only a few operations are required to start the application and to open a desired file from the file browser, whereby the operation efficiency is improved.

Figure 12:
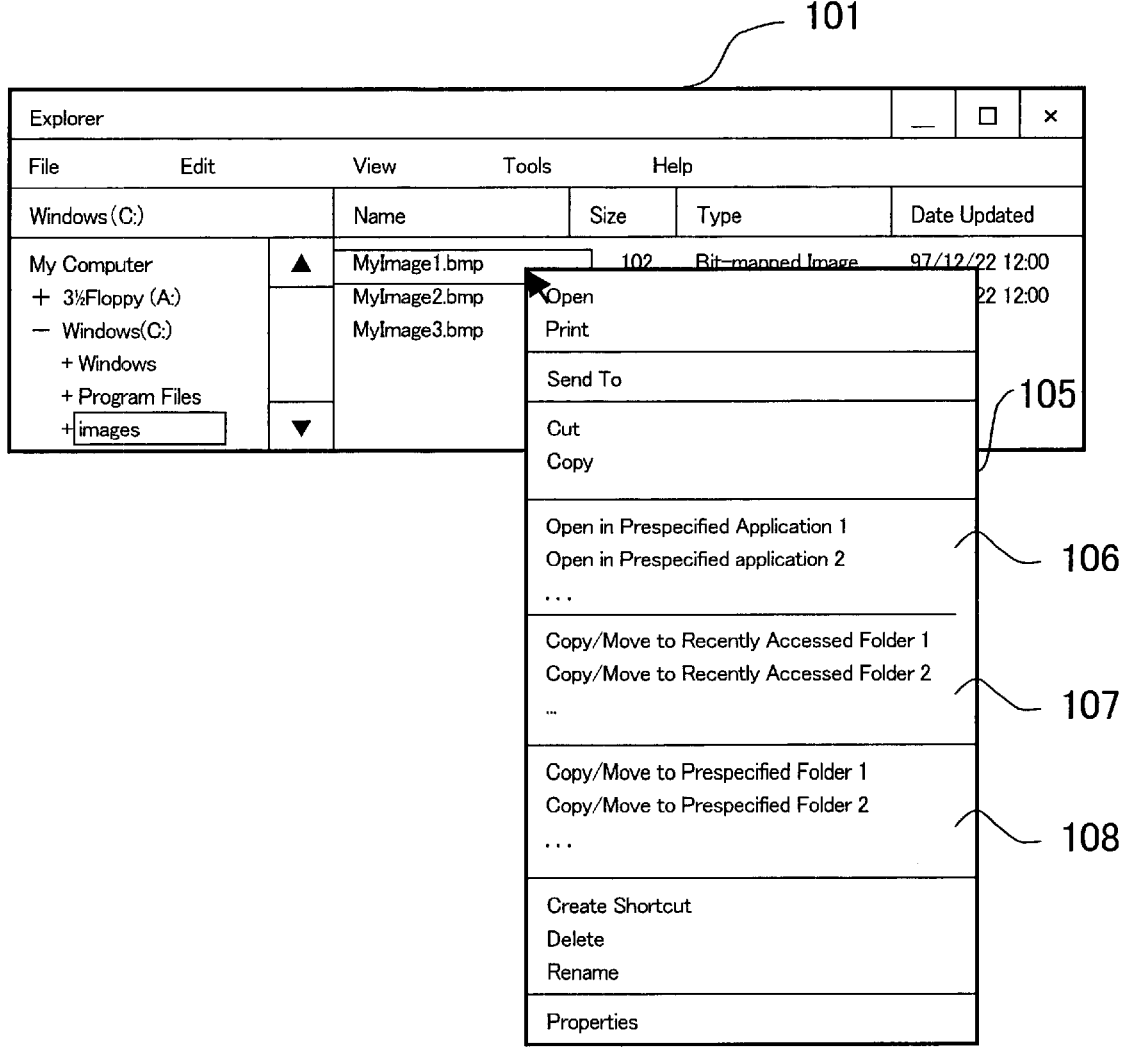
FIG. 12 is a diagram showing a second screen displayed by the file/icon menu control section.

FIG. 12 shows a second screen displayed by the file/icon menu control section. In FIG. 12, the file browser 101 is shown, and with an "images" folder selected, "MyImage1.bmp", which is a data file, is selected and then right-clicked or "MyImage1.bmp" is directly right-clicked, whereupon a menu 105 opens. This menu 105 additionally displays an "Open in Prespecified Application" list 106, a "Copy/Move to Recently Accessed Folder" list 107 and a "Copy/Move to Prespecified Folder" list 108, all created by the file/icon menu item creating section 33. The added menu items are also shown in the menu which appears when a single or a plurality of data files or icons thereof are selected and right-clicked on the desktop or in the browser.

By selecting a prespecified application from the menu 105, it is possible to start the application and open the previously selected data file. Thus, unlike the conventional menu which starts the only one application defined in Windows when the item "Open" is selected therein, the menu 105 permits a selected file to be opened in a desired application, regardless of the Windows definitions, by setting a plurality of applications beforehand.

Also, by selecting an item "Copy/Move to Recently Accessed Folder" or "Copy/Move to Prespecified Folder" in the menu 105, it is possible to copy/move the selected data file to the folder represented by the selected item. Whether a copy or move operation is performed is governed by general manipulations defined in the environment.

Figure 13:
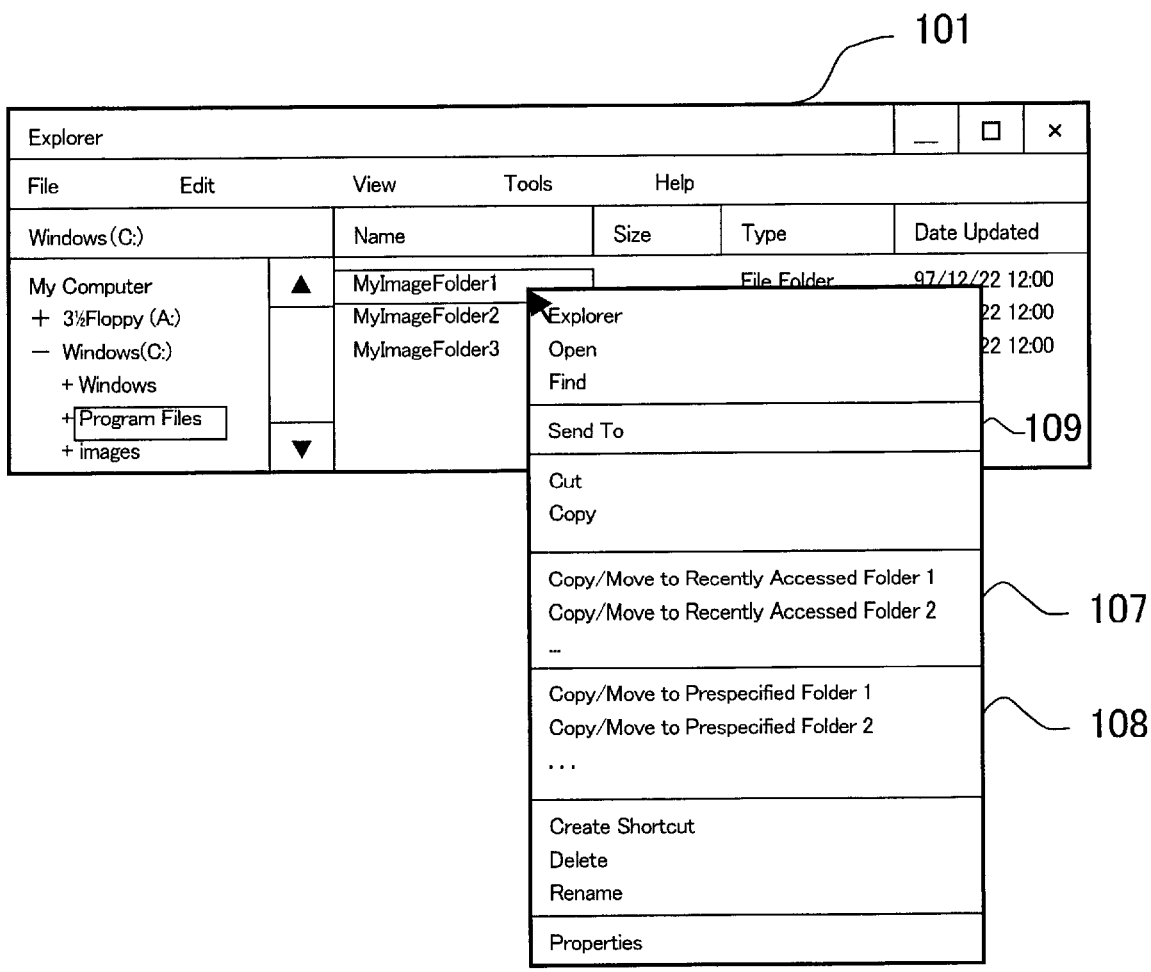
FIG. 13 is a diagram showing a third screen displayed by the file/icon menu control section.

FIG. 13 shows a third screen displayed by the file/icon menu control section. In FIG. 13, the file browser 101 is shown, and with the "images" folder selected, a folder "MyImageFolder1" is selected and then right-clicked or the folder "MyImageFolder1" is directly right-clicked, whereupon a menu 109 opens. This menu 109 additionally displays the "Copy/Move to Recently Accessed Folder" list 107 and the "Copy/Move to Prespecified Folder" list 108, both created by the file/icon menu item creating section 33. The added menu items are also shown in the menu which appears when an icon representing a file or a folder or a plurality of application files, data files or folders are selected and right-clicked on the desktop or in the browser.

By selecting an item "Copy/Move to Recently Accessed Folder" or "Copy/Move to Prespecified Folder" in the menu 109, it is possible to copy/move the selected folder to the folder represented by the selected item. Thus, with a few operations in the file browser 101, a desired folder can be copied/moved to frequently used folders.

The flows of processes executed by the item creating sections etc. mentioned above will be now described.

Figure 14:
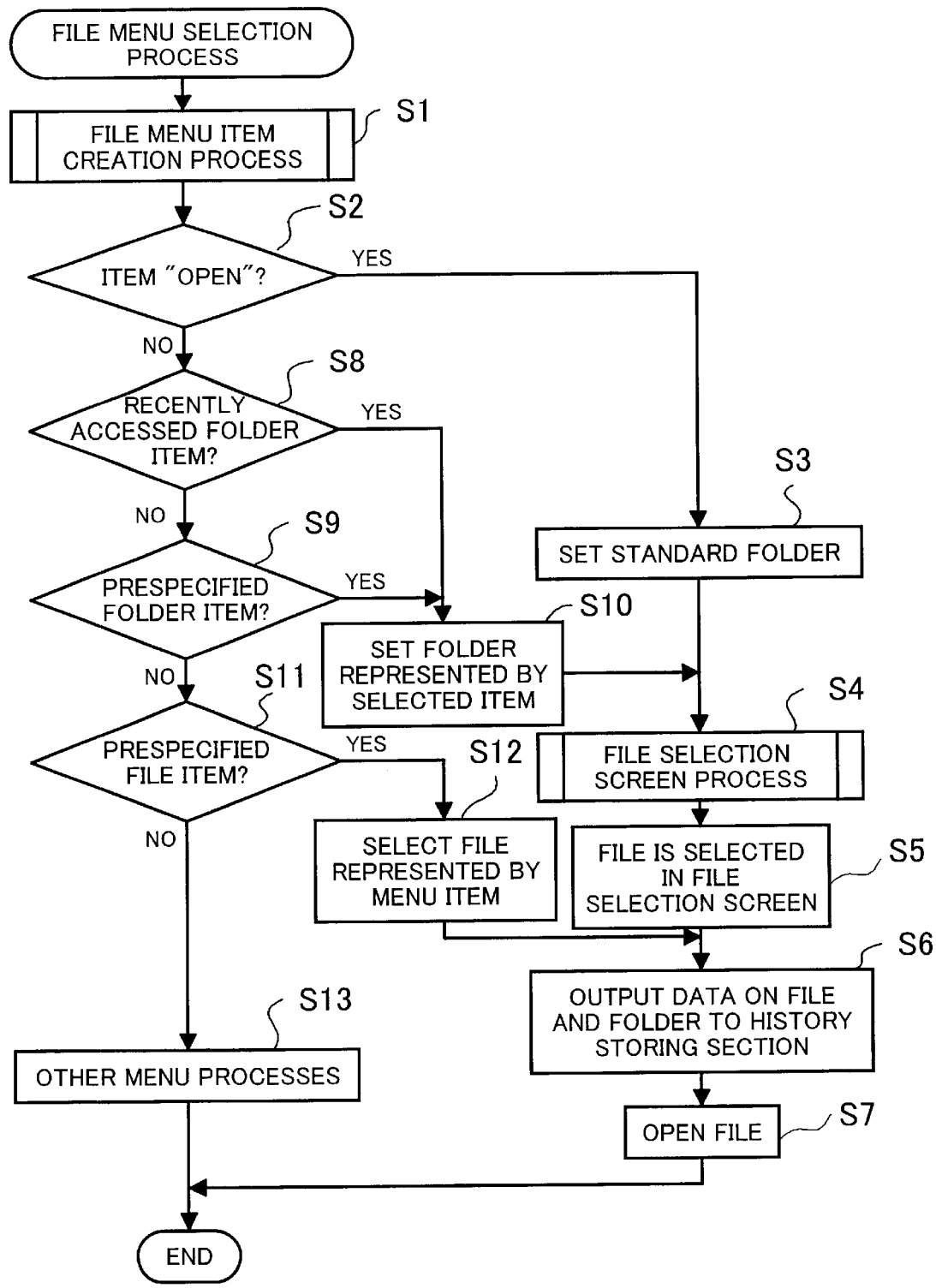
FIG. 14 is a flowchart showing the flow of a file menu selection process.

FIG. 14 is a flowchart showing the flow of a file menu selection process. In the file menu selection process, when "File" is selected in an application, for example, file menu items are created by means of the file menu item creating section (Step S1). Creation of file menu items will be explained later. It is then determined whether or not the item "Open" has been selected in the file menu in which the created file menu items are additionally displayed (Step S2). If the item "Open" has been selected, a standard folder of the application concerned is set (Step S3), and the file selection screen is called with its current folder switched to the standard folder in a file selection screen process (Step S4). The file selection screen process will be described later. Subsequently, a file is selected in the file selection screen (Step S5), data on the selected file and the folder containing the selected file is output as history data to the history storing section (Step S6), and the selected file is opened in the application (Step S7).

If it is judged in Step S2 that the item "Open" has not been selected, it is determined whether the item selected in the file menu is a recently accessed folder item or a folder item prespecified by the settings (Step S8, S9). If either folder item is selected in the file menu, the folder represented by the selected item is set (Step S10), and the file selection screen process is executed with the current folder switched to the set folder.

If it is judged in Steps S8 and S9 that no folder item has been selected, it is determined whether or not a prespecified file item has been selected (Step S11). When a file item has been selected, a file represented by this menu item is selected (Step S12), and the flow proceeds to the step of storing data on the file in history.

In cases where a menu item in the file menu other than the item "Open" and the items created and added by the file menu item creating section has been selected, a corresponding process is executed as in the conventional menu (Step S13).

Figure 15:
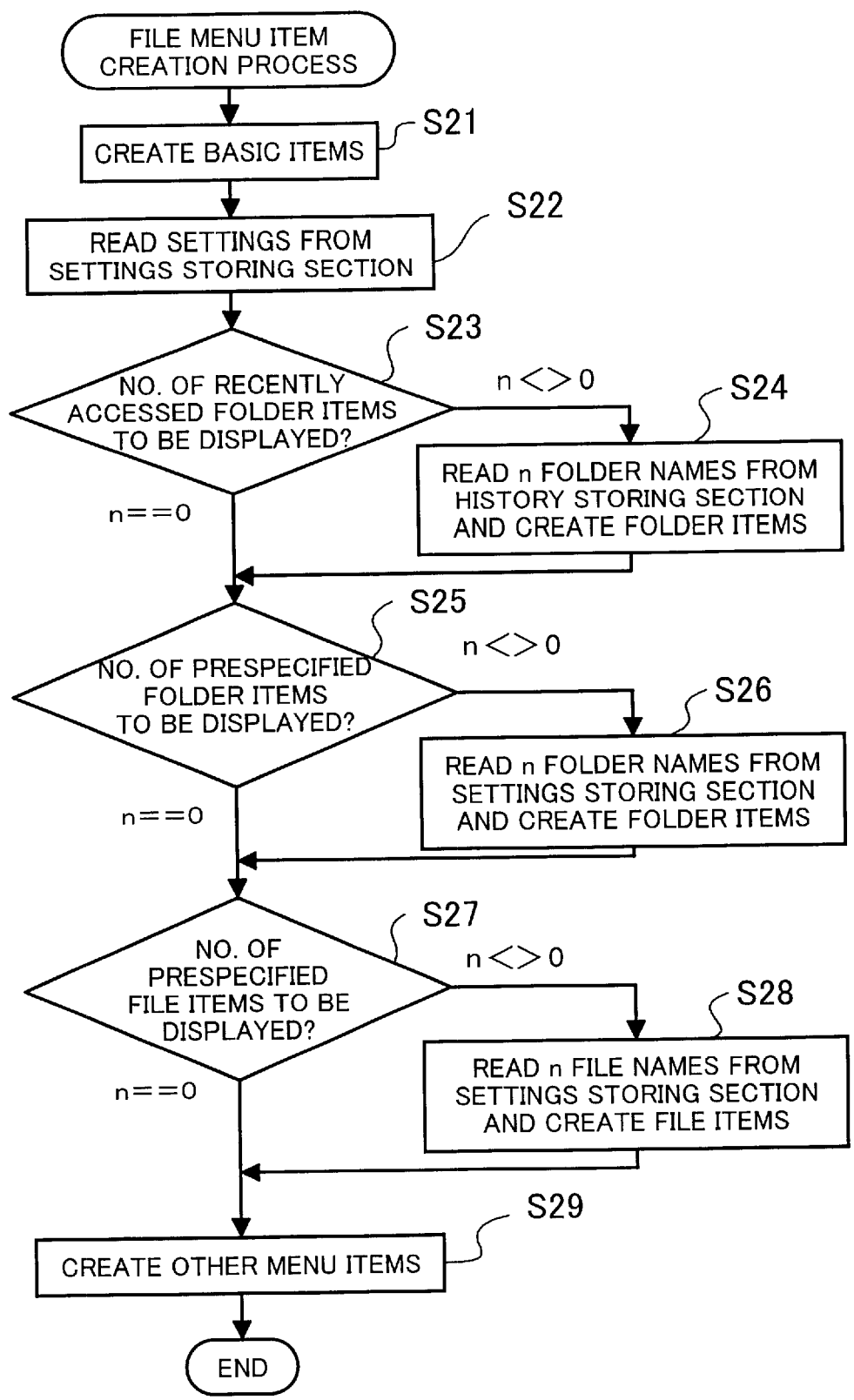
FIG. 15 is a flowchart showing the flow of a file menu item creation process.

FIG. 15 is a flowchart showing the flow of the file menu item creation process. In the file menu item creation process, first, basic menu items originally possessed by the application concerned are created (Step S21), and the settings are read from the settings storing section (Step S22).

Subsequently, the number of recently accessed folder items to be displayed is checked (Step S23); if the set number of display items is not "0", n folder names are read from the history storing section and folder items are created (Step S24). If it is judged in Step S23 that the set number of display items is "0", then the number of prespecified folder items to be displayed is checked (Step S25); if the set number of display items is not "0", n folder names are read from the settings storing section and folder items are created (Step S26). If it is judged in Step S25 that the set number of display items is "0", then the number of prespecified file items to be displayed is checked (Step S27); if the set number of display items is not "0", n file names are read from the settings storing section and file items are created (Step S28). Subsequently, other basic menu items are created (Step S29).

Figure 16:
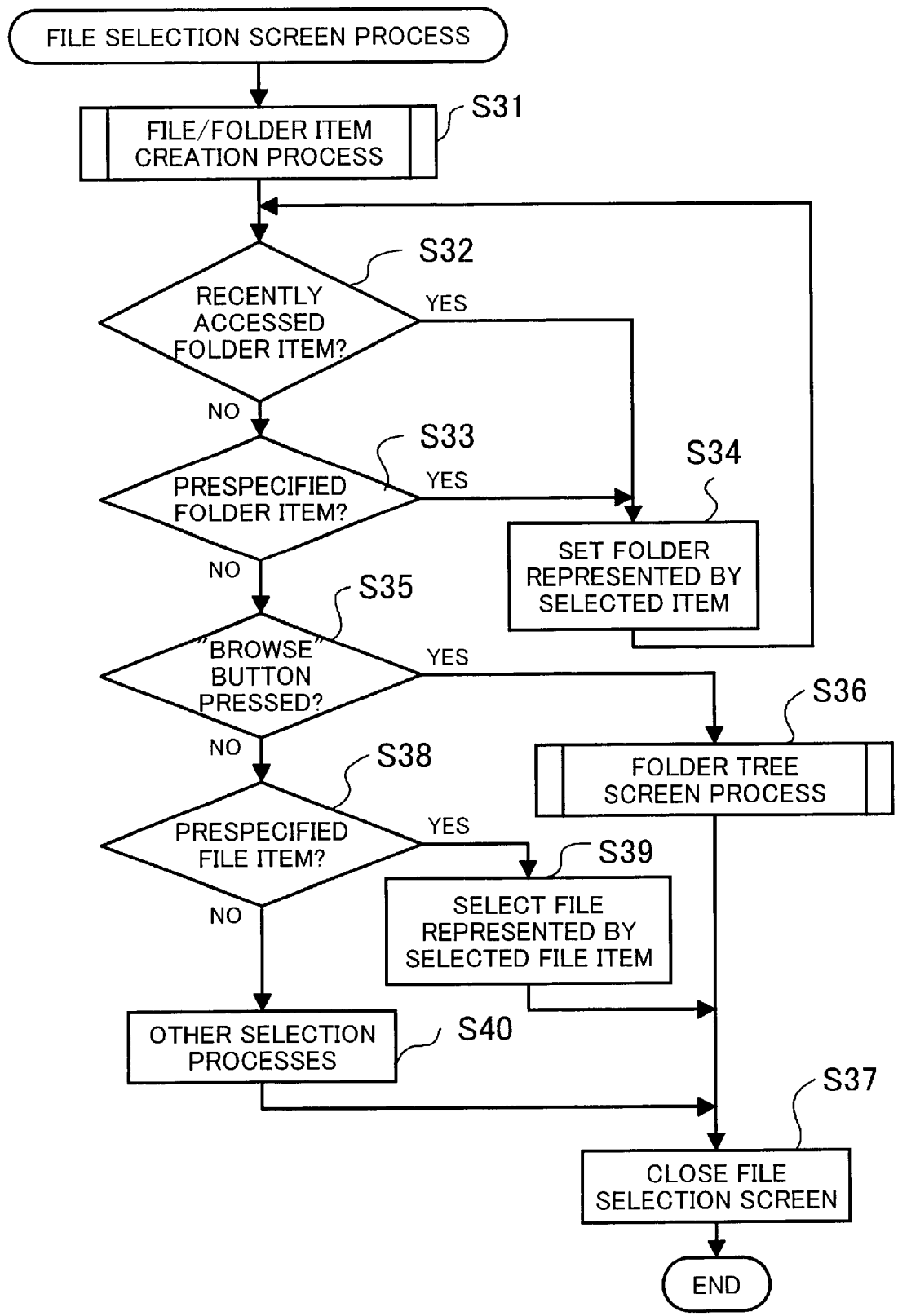
FIG. 16 is a flowchart showing the flow of a file selection screen process.

FIG. 16 is a flowchart showing the flow of the file selection screen process. First, in the file selection screen process, a file/folder item creation process is executed (Step S31). The file/folder item creation process will be explained later. Subsequently, it is determined whether the selected item is a recently accessed folder item or a folder item prespecified by the settings (Step S32, S33). When the selected item is a folder item, a folder represented by the selected item is set and the current folder of the currently open file selection screen is switched to the set folder (Step S34), whereupon the flow returns to Step S32.

Where the file selection screen has the "Browse" button, it is then determined whether or not the "Browse" button has been pressed (Step S35). If the "Browse" button has been pressed, a folder tree screen process is executed (Step S36), and if an item is selected in the folder tree screen, the file selection screen is closed (Step S37). The folder tree screen process will be described later.

Subsequently, it is determined whether or not a file item prespecified by the settings has been selected (Step S38), and if a prespecified file item has been selected, a file represented by the selected file item is selected (Step S39), and the flow proceeds to Step S37 to close the file selection screen. If other originally existing items or some other items are selected, corresponding selection processes are executed (Step S40).

Figure 17:
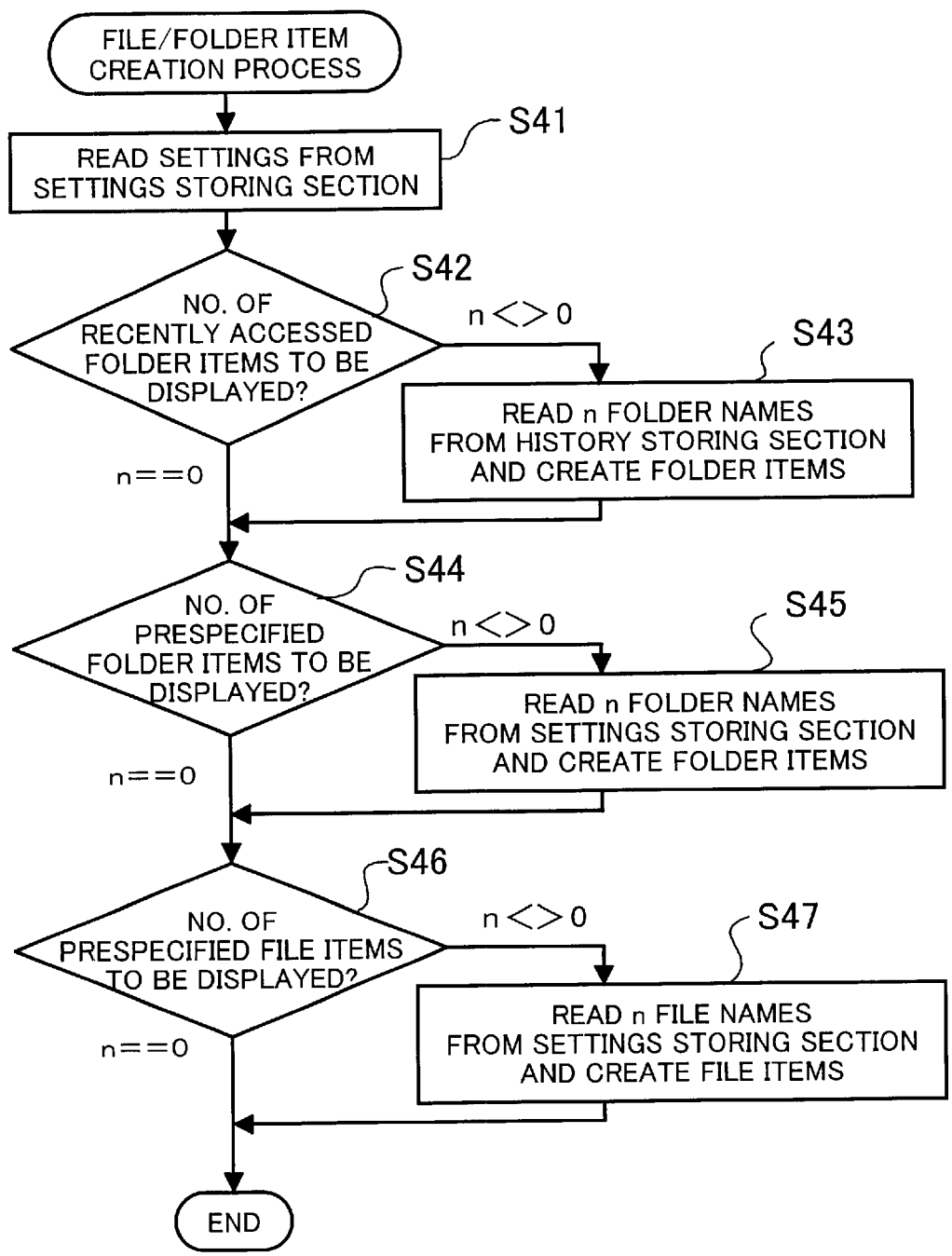
FIG. 17 is a flowchart showing the flow of a file/folder item creation process.

FIG. 17 is a flowchart showing the flow of the file/folder item creation process. In the file/folder item creation process, first, the settings are read from the settings storing section (Step S41). Then, the number of recently accessed folder items to be displayed is checked (Step S42), and if the set number of display items is not "0", n folder names are read from the history storing section and folder items are created (Step S43). If it is judged in Step S42 that the set number of display items is "0", then the number of prespecified folder items to be displayed is checked (Step S44), and if the set number of display items is not "0", n folder names are read from the settings storing section and folder items are created (Step S45). If it is judged in Step S44 that the set number of display items is "0", then the number of prespecified file items to be displayed is checked (Step S46), and if the set number of display items is not "0", n file names are read from the settings storing section and file items are created (Step S47).

Figure 18:
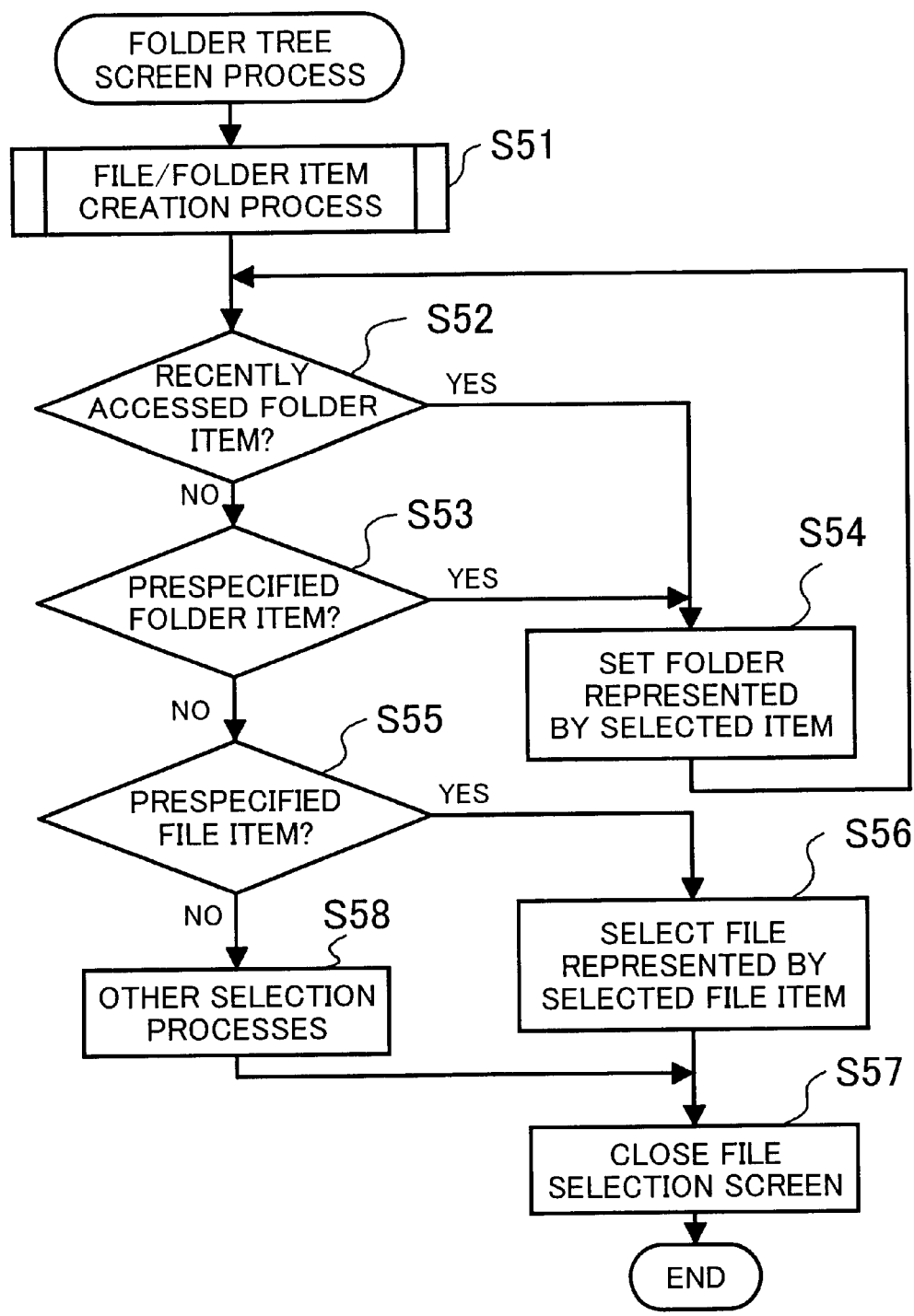
FIG. 18 is a flowchart showing the flow of a folder tree screen process.

FIG. 18 is a flowchart showing the flow of the folder tree screen process. In the folder tree screen process, first, the file/folder item creation process shown in FIG. 17 is executed (Step S51). Subsequently, it is determined whether the selected item is a recently accessed folder item or a folder item prespecified by the settings (Step S52, S53). When the selected item is a folder item, a folder represented by the selected item is set and is opened in the displayed tree (Step S54), whereupon the flow returns to Step S52.

Subsequently, it is determined whether or not a prespecified file item has been selected (Step S55); if a prespecified file item has been selected, the corresponding file is selected (Step S56) and the screen is closed (Step S57). If the selected item is not a prespecified file item, a corresponding selection process of the folder tree screen is carried out (Step S58).

Figure 19:
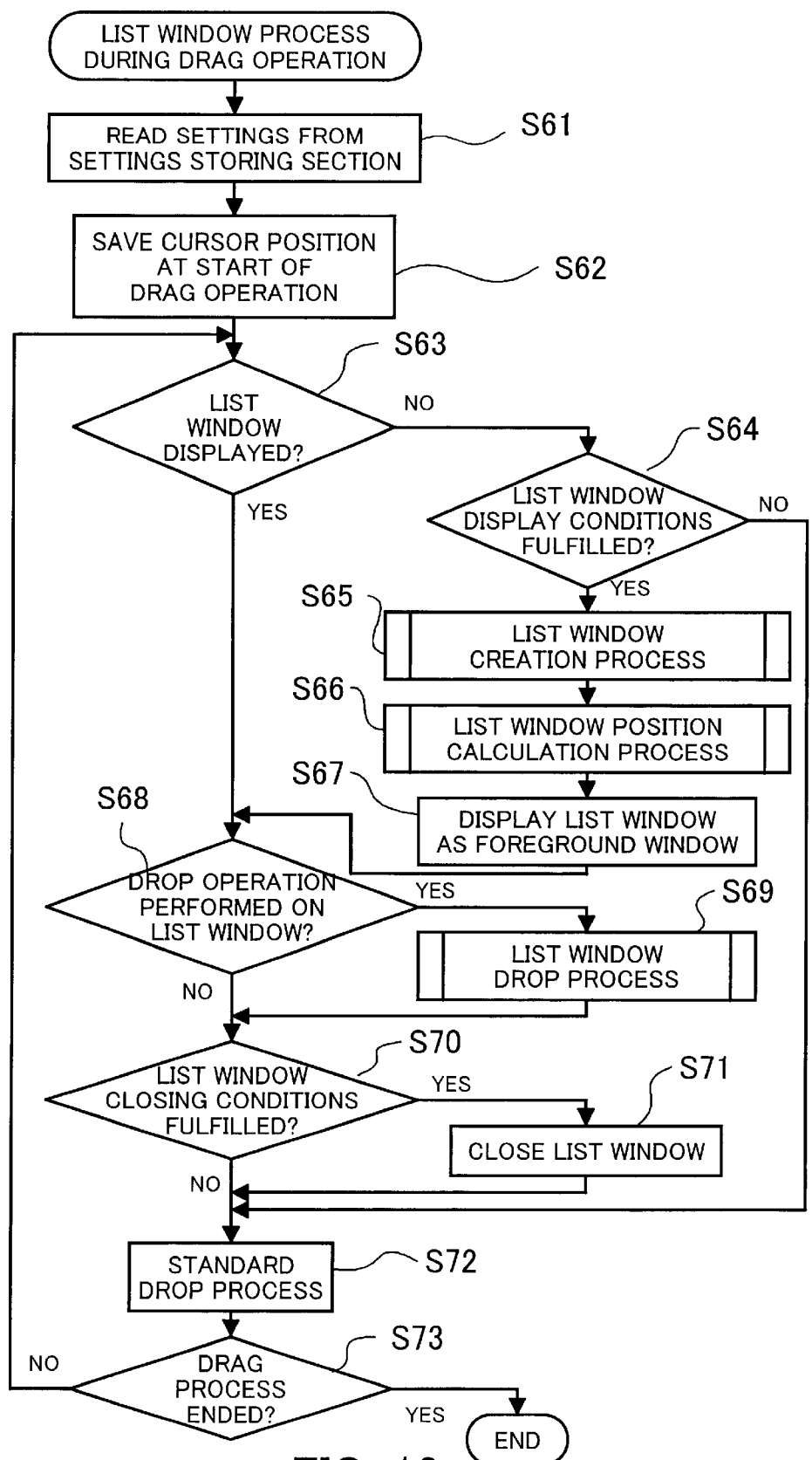
FIG. 19 is a flowchart showing the flow of a list window process executed during a drag operation.

FIG. 19 is a flowchart showing the flow of a list window process executed at the time of drag operation. The list window process for drag operation is initiated in response to start of a drag operation. When a drag operation is started, various settings are read from the settings storing section (Step S61) and the cursor position at the start of the drag operation is stored (Step S62).

Subsequently, it is determined whether or not the list window is displayed (Step S63), and if the list window is not displayed, then it is determined whether or not the conditions for displaying the list window are fulfilled (Step S64). If the display conditions are fulfilled, a list window is created (Step S65), the position of the list window is calculated (Step S66), and the created list window is displayed at the calculated position as a foreground window (Step S67). The list window creation process and the list window position calculation process will be described in detail later. If the display conditions are not fulfilled, the flow proceeds to an ordinary drop process.

If it is judged in Step S63 that the list window is displayed, it is determined whether or not a drop operation has been performed on the list window (Step S68), and if a drop operation has been performed on the list window, a list window drop process is executed (Step S69). The list window drop process will be described later.

Then, it is determined whether or not the conditions for closing the list window are fulfilled (Step S70). If the list window closing conditions are fulfilled, the list window is closed (Step S71). A standard drop process is thereafter carried out (Step S72), and it is then determined whether or not the drag process has ended (Step S73). If the drag process has not ended yet, the flow returns to Step S63, and if the drag process has ended, this process is terminated.

Figure 20:
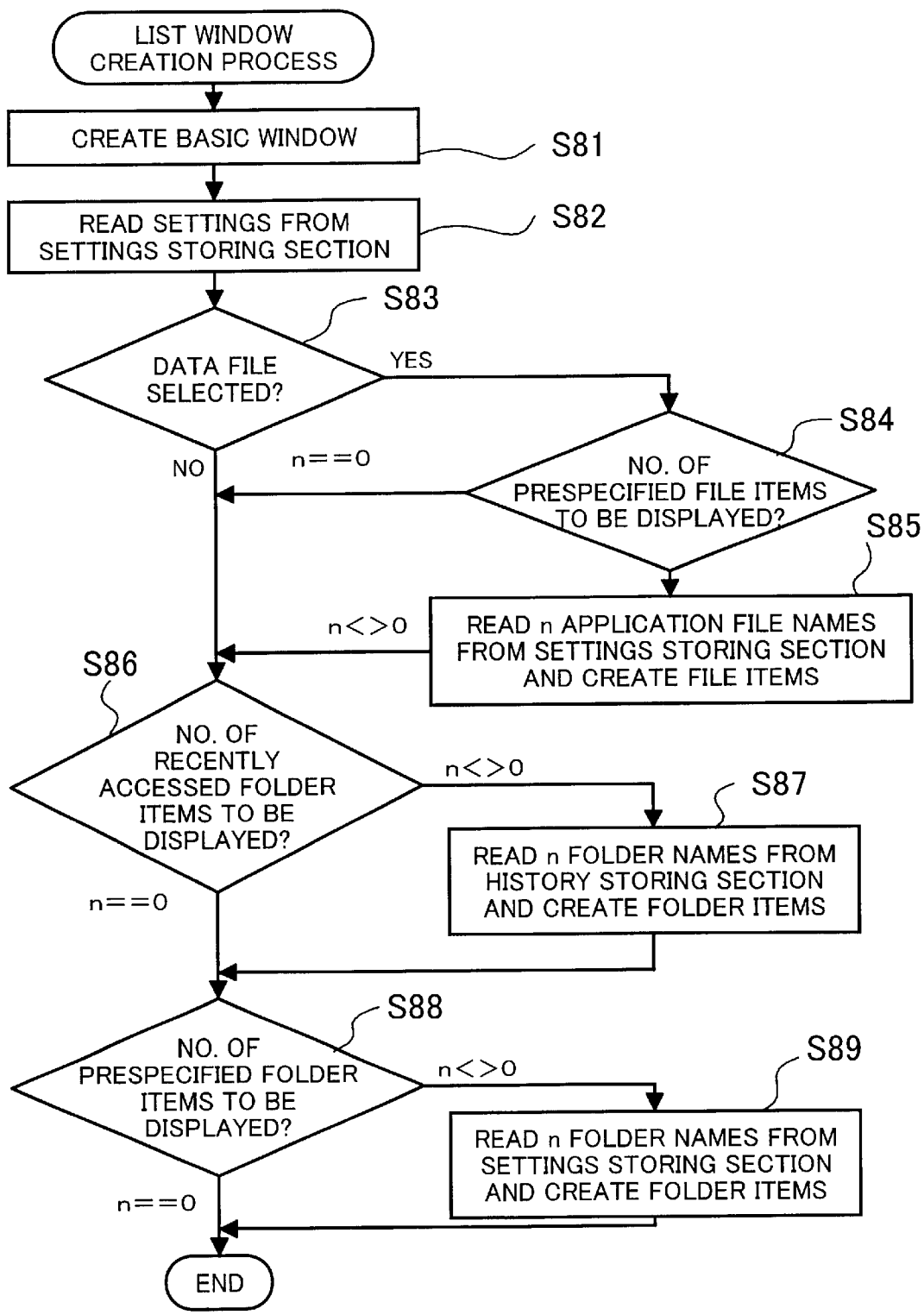
FIG. 20 is a flowchart showing the flow of a list window creation process.

FIG. 20 is a flowchart showing the flow of the list window creation process. In the list window creation process, first, a basic window is created (Step S81), and the settings such as display position, display format, etc. are read from the settings storing section (Step S82).

It is then determined whether or not the dragged object is a data file (Step S83), and if the dragged object is a data file, the number of prespecified file items to be displayed is checked (Step S84). If the set number of display items is not "0", n application file names are read from the settings storing section and file items are created (Step S85). Subsequently, the number of recently accessed folder items to be displayed is checked (Step S86); if the set number of display items is not "0", n folder names are read from the history storing section and folder items are created (Step S87). Then, the number of prespecified folder items to be displayed is checked (Step S88); if the set number of display items is not "0", n folder names are read from the settings storing section and folder items are created (Step S89).

Figure 21:
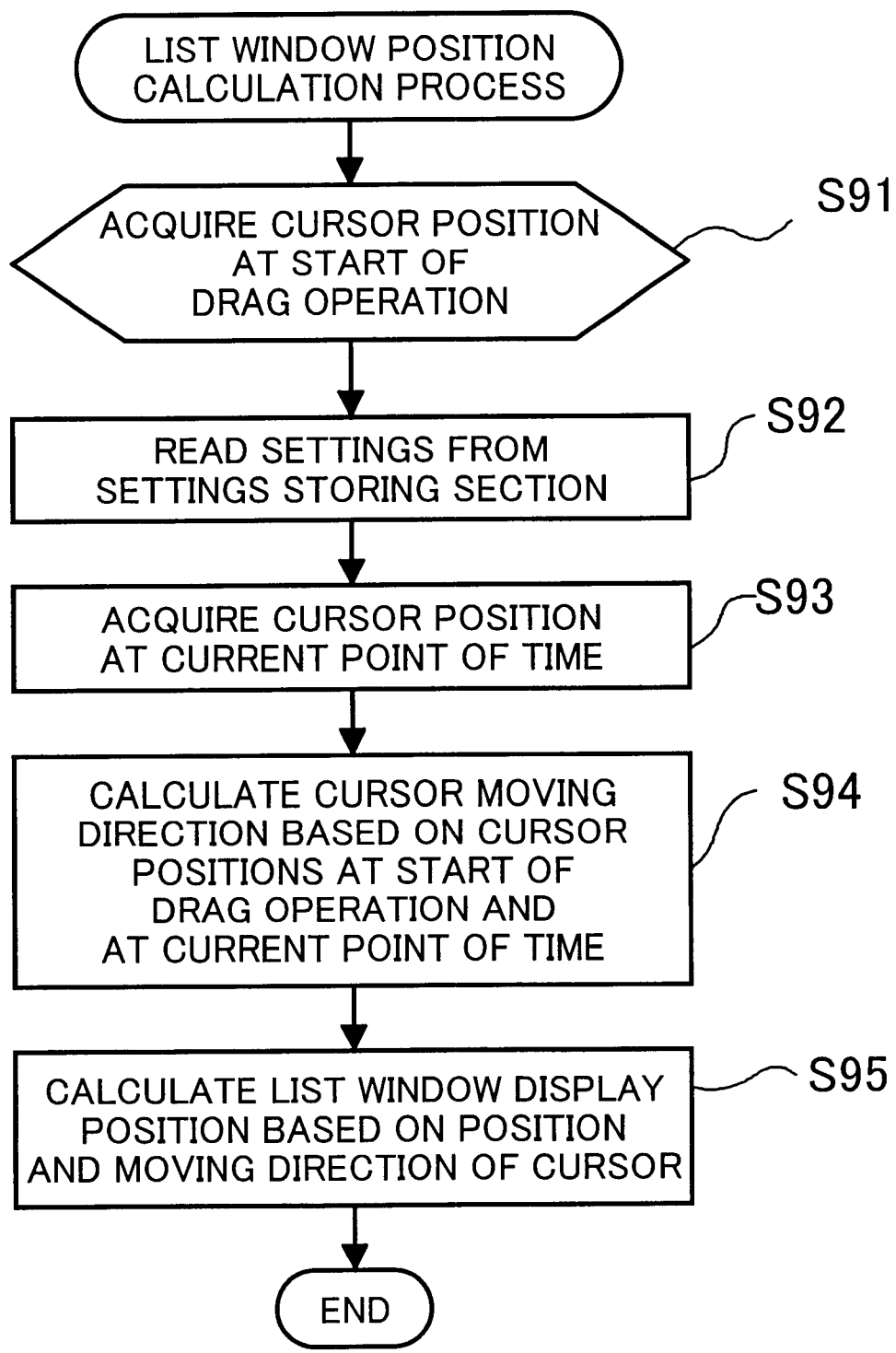
FIG. 21 is a flowchart showing the flow of a list window position calculation process.

FIG. 21 is a flowchart showing the flow of the list window position calculation process. First, in the list window position calculation process, the mouse cursor position at the start of the drag operation is acquired (Step S91). Then, the list window display conditions are read from the settings storing section (Step S92), and the cursor position at the current point of time is acquired (Step S93). Based on the acquired cursor positions at the start of the drag operation and at the current point of time, the moving direction of the cursor is calculated (Step S94). Subsequently, the position where the list window is to be displayed is calculated based on the position and moving direction of the cursor (Step S95).

Figure 22:
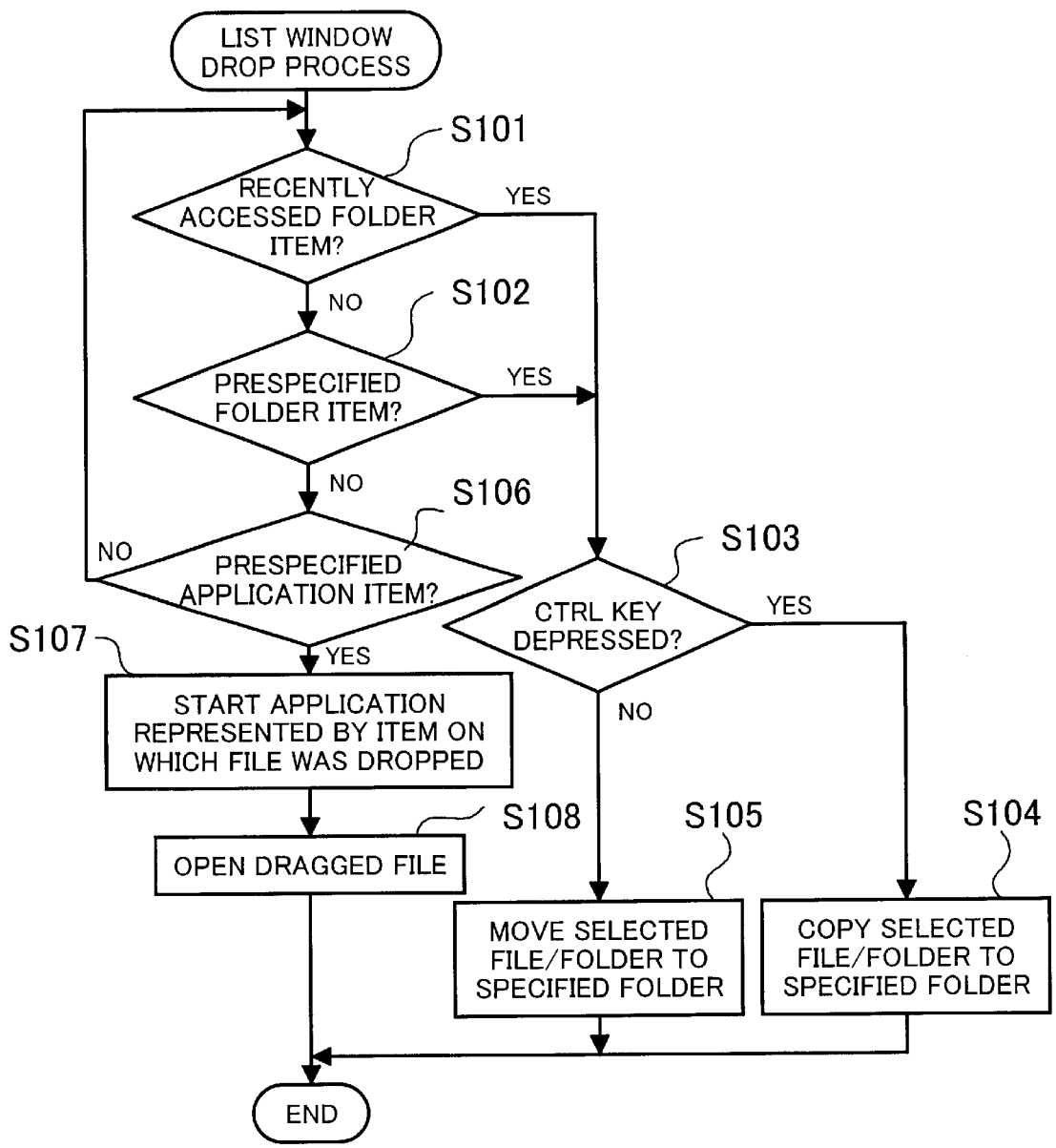
FIG. 22 is a flowchart showing the flow of a list window drop process.

FIG. 22 is a flowchart showing the flow of the list window drop process. First, in the list window drop process, when the dragged file/folder is dropped onto an object in the list window, a determination is made as to whether or not the target object of drop operation is a recently accessed folder item, and then whether or not the target object of drop operation is a folder item prespecified by the settings (Step S101, S102). When either folder item is the target object of drop operation, it is determined whether or not the "CTRL" key had been depressed during the drop operation (Step S103). If the "CTRL" key had been pressed during the drop operation, the dragged file/folder is copied to the folder represented by the item onto which the file/folder was dropped (Step S104), and if not, the dragged file/folder is moved to the folder represented by the item onto which the file/folder was dropped (Step S105). If the item onto which the dragged file/folder has been dropped is not a folder item, it is determined whether or not the item in question is an application item (Step S106). If the item is not an application item, the flow returns to Step S101; if the item is an application item, on the other hand, the application represented by the item onto which the dragged file has been dropped is started (Step S107) and the dragged file is opened (Step S108).

A menu selection process for a file in the file browser or an icon on the desktop will be now described.

Figure 23:
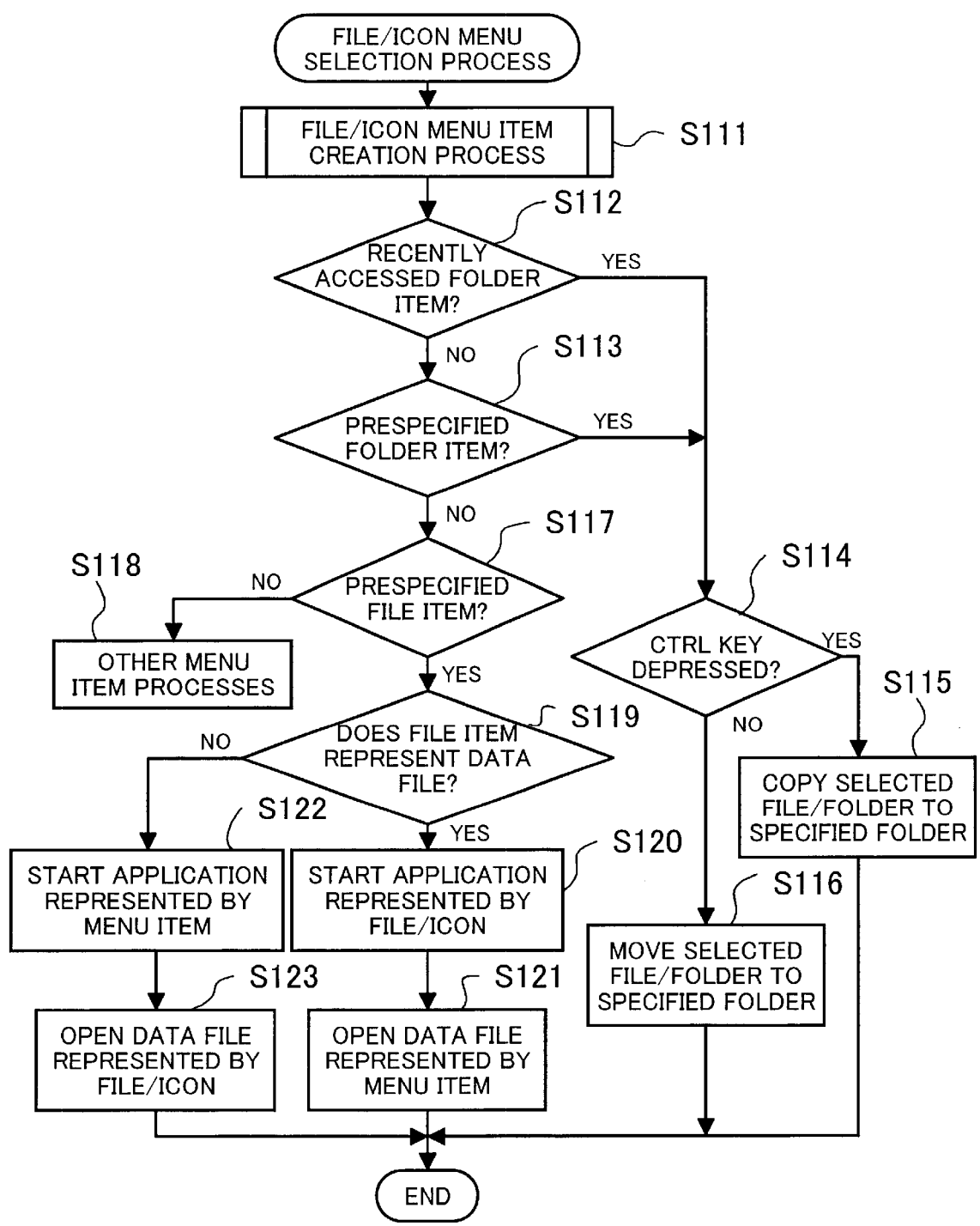
FIG. 23 is a flowchart showing the flow of a file/icon menu selection process.

FIG. 23 is a flowchart showing the flow of the file/icon menu selection process. In the menu selection process for a file in the file browser or an icon on the desktop, first, when a menu is to be opened in response to a right-click etc., a process for creating file/icon menu items is executed (Step S111). The file/icon menu item creation process will be described in detail later.

Subsequently, it is determined whether an item selected in the displayed menu is a recently accessed folder item or a folder item prespecified by the settings (Step S112, S113). When either folder item has been selected, it is determined whether or not the "CTRL" key had then been depressed (Step S114). If the "CTRL" key had been depressed during the menu selection, the file/folder selected in advance of the opening of the menu is copied to the folder specified by the menu selection (Step S115), and if not, the previously selected file/folder is moved to the folder specified by the menu selection (Step S116).

It is then determined whether or not the menu selection designates a file item prespecified by the settings (Step S117), and if the selected item is not a file item prespecified by the settings, other menu item processes are executed (Step S118). If it is judged in Step S117 that a file item prespecified by the settings has been selected in the menu, it is determined whether or not the file selected in the menu is a data file (Step S119). If the file item selected in the menu represents a data file, the application represented by the file/icon selected in advance is started (Step S120) and the data file represented by the menu item selected in the menu is opened (Step S121). If, on the other hand, it is judged in Step S119 that the file item selected in the menu is not a data file, that is, the selected file item is an application file, the application represented by the file item selected in the menu is started (Step S122) and the data file represented by the file/icon selected in advance is opened (Step S123).

Figure 24:
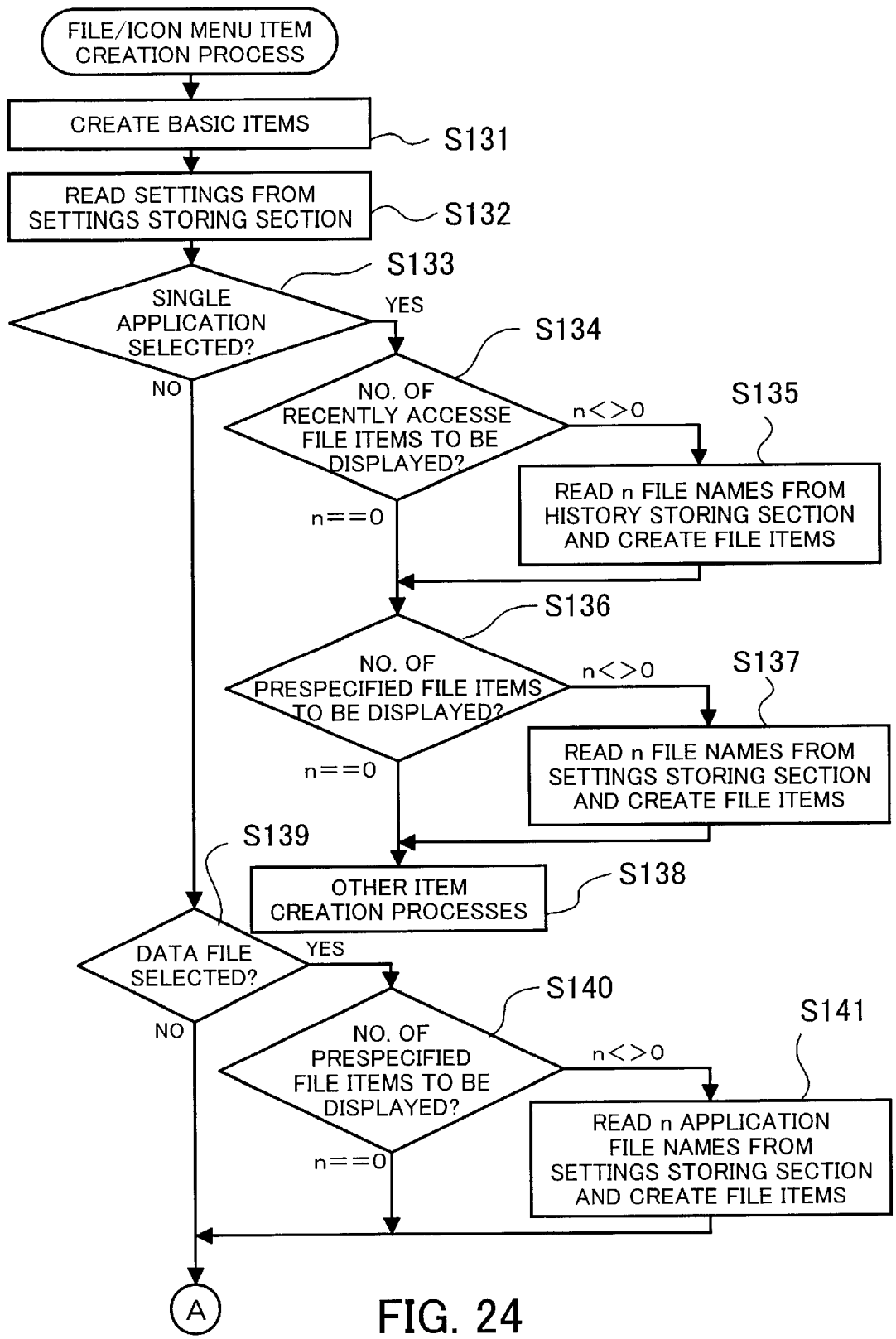
FIG. 24 is a flowchart (part 1) showing the flow of a file/icon menu item creation process.
Figure 25:
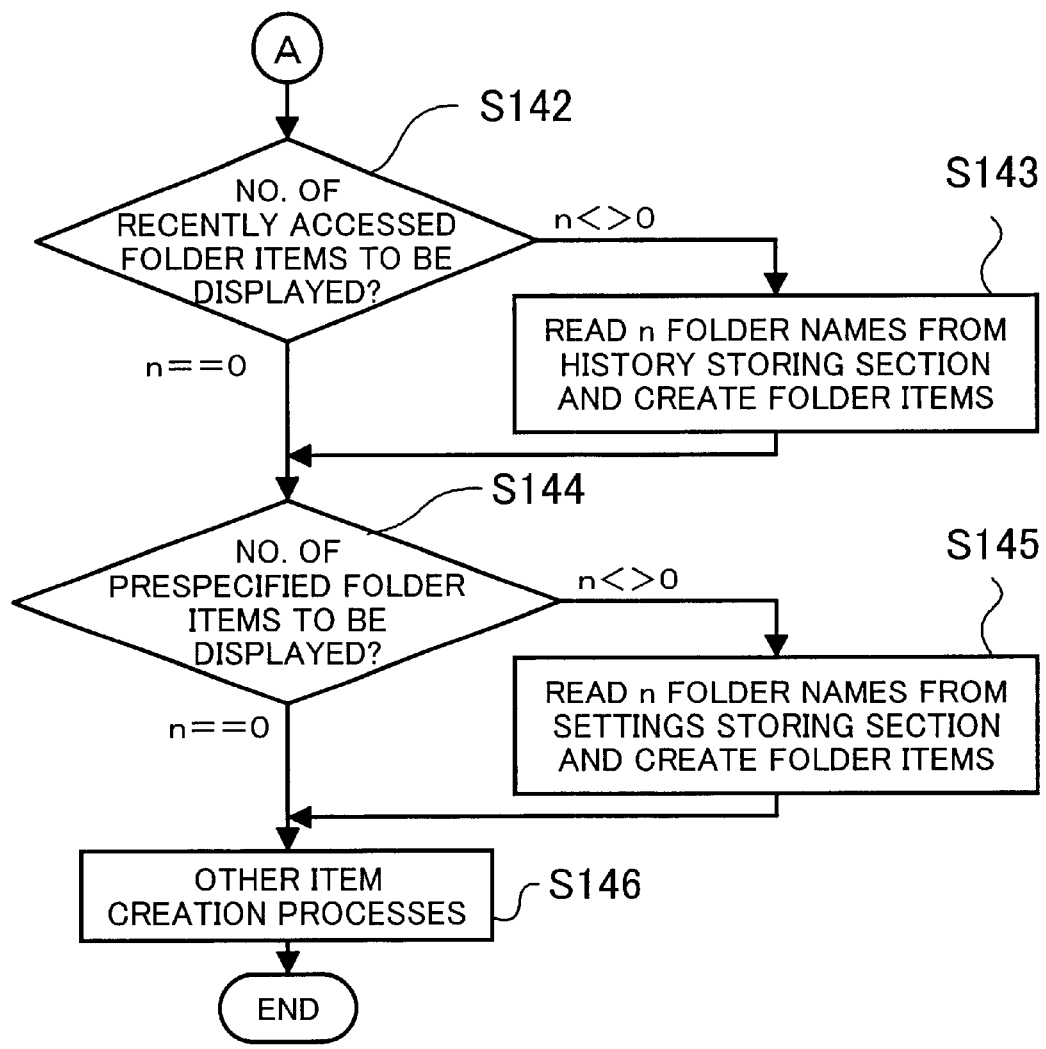
FIG. 25 is a flowchart (part 2) showing the flow of the file/icon menu item creation process.

FIGS. 24 and 25 show the flow of the file/icon menu item creation process. When a file/folder in the file browser or an icon on the desktop is right-clicked, first, basic items are created (Step S131) and the settings are read from the settings storing section (Step S132). It is then determined whether or not the selected file/icon is a single application (Step S133). If the file/icon on which the menu has been opened is an application, the number of recently accessed file items to be displayed is checked (Step S134); if the set number of display items is not "0", n file names are read from the history storing section and file items are created (Step S135). Subsequently, the number of prespecified file items to be displayed is checked (Step S136); if the set number of display items is not "0", n file names are read from the settings storing section and file items are created (Step S137). The other remaining items of the menu are then created (Step S138).

If it is judged in Step S133 that the selected file/icon is not a single application, it is determined whether or not the selected file/icon is a data file (Step S139). If the selected file/icon is a data file, the number of prespecified file items to be displayed is checked (Step S140); if the set number of display items is not "0", n application file names are read from the settings storing section and file items are created (Step S141). Subsequently, the number of recently accessed folder items to be displayed is checked (Step S142); if the set number of display items is not "0", n folder names are read from the history storing section and folder items are created (Step S143). Then, the number of prespecified folder items to be displayed is checked (Step S144); if the set number of display items is not "0", n folder names are read from the settings storing section and folder items are created (Step S145). Finally, the other remaining items of the menu are created (Step S146).

The contents of the above-described processes achieved by the function of the computer may be described in a program to be recorded on a computer-readable recording medium. The program is executed by the computer, whereupon the above processes are achieved by the computer. The computer-readable recording medium includes a magnetic storage device and a semiconductor memory. In order to bring the program to market, the program may be stored in portable recording media, such as CD-ROMs or floppy disks, to be distributed, or the program may be stored in a storage device of a computer connected to a network so that it can be transferred to other computers through the network. The program is stored in a hard disk drive or the like of a computer, and when it is to be executed by the computer, the program is loaded in the main memory and executed.

As described above, according to the present invention, preset numbers of preset menu items are additionally displayed in the file menu, the file selection screen and the folder tree screen, which open from within applications, as well as in the menu which opens in relation to a file/folder or an icon thereof displayed in the file browser or on the desktop, and also preset numbers of preset items as target objects of drop operation are displayed as a window during drag-and-drop operation. This permits frequently used files/folders to be added to the menus in advance, making it possible to eliminate multiple selections required until a target file is opened or to greatly reduce the number of selections. At the time of drag-and-drop operation, the drop target list window in which frequently used files/folders are listed and which permits drop operation is displayed as a foreground window in the vicinity of the mouse cursor after the drag operation is started, and this eliminates the need to start an application in advance, to move a target object of drop operation to a position permitting drop operation, or to display a target object of drop operation such that drop operation can be performed, thus improving the efficiency of drag-and-drop operation. Further, since the items to be additionally displayed in the menus etc. and their display conditions can be set, the menus can be freely customized in accordance with user environments.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A file handling device for handling a file/folder in an application and in a file browser, and for handling an icon on a desktop comprising:

environment setting means for setting items to be displayed as menu items, the items comprising a pre-selected number of user-specified files/folders and a pre-selected number of most recently accessed files/folders;

setting storing means for storing contents of settings set by said environment setting means;

history storing means for storing a history of opened files/folders;

file menu item creation/display means for displaying, in a file menu, the recently accessed files/folders stored in said history storing means and the user-specified files/folders stored in said settings storing means;

file selection screen item creation/display means for displaying, in a file selection screen, the recently accessed files/folders stored in said history storing means and the user-specified files/folders stored in said settings storing means;

folder tree item creation/display means for displaying, in a folder tree menu, the recently accessed files/folders stored in said history storing means and the user-specified files/folders stored in said settings storing means;

drop list window creation/display means, responsive to a drag operation, for creating and displaying a drop list window showing, as target files/folders of a drop operation, the recently accessed files/folders stored in said history storing means and the user-specified files/folders stored in said settings storing means; and file/icon menu item creation/display means for displaying, in a menu when the menu is opened upon a file/folder being selected in a file browser or an icon being selected on the desktop, the recently accessed files/folders stored in said history storing means and the user-specified files/folders stored in said settings storing means.

2. The file handling device according to claim 1, wherein said file menu item creation/display means includes file menu item creating means, responsive to an operation to open the file menu, for acquiring items of recently accessed files/folders from said history storing means and items of files/folders set by means of said environment setting means from said settings storing means and creating file menu items, and file menu control means for displaying the file menu while adding thereto the file menu items created by said file menu item creating means.

3. The file handling device according to claim 2, wherein said file selection screen item creation/display means includes file selection screen item creating means, responsive to an operation to select an item "Open" in the file menu, for acquiring the items of recently accessed files/folders from said history storing means and the items of files/folders set by means of said environment setting means from said settings storing means and creating file selection screen items, and file selection screen control means for displaying the file selection screen while adding thereto the file selection screen items created by said file selection screen item creating means.

4. The file handling device according to claim 3, wherein said file selection screen item creating means switches a current folder to a selected folder in response to an operation to select a folder item added by said file menu item creating means in the file menu displayed by said file menu control means, and switches the current folder to a standard folder in response to an operation to select the item "Open" in the file menu.

5. The file handling device according to claim 3, wherein said file selection screen control means has an "Open and Add File" button whereby a file selected in the file selection screen is opened while being added to a file list in said history storing means as a recently accessed file, an "Open and Add Folder" button whereby a file selected in the file selection screen is opened while a folder containing the selected file is added to a folder list in said history storing means as a recently accessed folder, and an "Open and Add File and Folder" button whereby a file selected in the file selection screen is opened while the selected file and a folder containing the selected file are added to the file list and the folder list, respectively, of said history storing means as recently accessed file and folder.

6. The file handling device according to claim 3, wherein said folder tree item creation/display means includes folder tree item creating means, responsive to a depression of a "Browse" button in the file selection screen displayed by said file selection screen control means, for acquiring the items of recently accessed files/folders from said history storing means and the items of files/folders set by means of said environment setting means from said settings storing means and creating folder tree items, and folder tree screen control means for displaying a folder tree screen while adding thereto the folder tree items created by said folder tree item creating means.

7. The file handling device according to claim 1, wherein said file/icon menu item creation/display means includes file/icon menu item creating means, responsive to an operation to display a menu in a situation where a file/folder displayed in the file browser is selected or an icon on the desktop is selected, for acquiring items of recently accessed files/folders from said history storing means and items of files/folders set by means of said environment setting means from said settings storing means and creating file/icon menu items, and file/icon menu control means for additionally displaying, in a file/icon menu, the file/icon menu items created by said file/icon menu item creating means.

8. The file handling device according to claim 7, wherein said file/icon menu item creating means acquires items of recently accessed files from said history storing means and items of files set by means of said environment setting means from said settings storing means to create file/icon menu items if a file selected in the file browser or a file represented by an icon selected on the desktop is an application file.

9. The file handling device according to claim 7, wherein said file/icon menu item creating means acquires items of recently accessed folders from said history storing means and items of application files/folders set by means of said environment setting means from said settings storing means to create file/icon menu items if a file selected in the file browser or a file represented by an icon selected on the desktop is a data file.

10. The file handling device according to claim 7, wherein said file/icon menu item creating means acquires items of recently accessed folders from said history storing means and items of folders set by means of said environment setting means from said settings storing means to create file/icon menu items if a folder is selected in the file browser.

11. The file handling device according to claim 1, wherein said history storing means stores a history of files/folders opened by said file menu item creation/display means, said file selection screen item creation/display means or said folder tree item creation/display means within a range set by means of said environment setting means with respect to numbers of files/folders to be recorded, by removing history data on an oldest file/folder if the opened file/folder is not included in the files/folders already stored.

12. The file handling device according to claim 1, wherein said environment setting means includes display item setting means for setting items to be displayed as menu items, and drag-and-drop setting means for setting a display format, display position and display conditions for the drop list window which is displayed during drag-and-drop operation.

13. A file handling device for handling a file/folder in an application and in a file browser, and for handling an icon on a desktop, comprising:

environment setting means for setting items to be displayed as menu items, the items comprising user-specified files/folders and recently accessed files/folders;

settings storing means for storing contents of settings set by said environment setting means;

history storing means for storing a history of opened files/folders;

file menu item creation/display means for displaying, in a file menu, the recently accessed files/folders stored in said history storing means and the user-specified files/folders stored in said settings storing means;

file selection screen item creation/display means for displaying, in a file selection screen, the recently accessed files/folders stored in said history storing means and the user-specified files/folders stored in said settings storing means;

folder tree item creating/display means for displaying, in a folder tree menu, the recently accessed files/folders stored in said history storing means and the user-specified files/folders stored in said settings storing means;

drop list window creation/display means, responsive to a drag operation, for creating and displaying a drop list window showing, as target files/folders of a drop operation, the recently accessed files/folders stored in said history storing means and the user-specified files/folders stored in said settings storing means; and file/icon menu item creation/display means for displaying, in a menu when the menu is opened upon a file/folder being selected in a file browser or an icon being selected on the desktop, the recently accessed files/folders stored in said history making means and the user-specified files/folders stored in said settings storing means, wherein said drop list window creation/display means includes drop list window display item creating means, responsive to start of a drag operation of a selected file/folder, for acquiring items of recently accessed folders from said history storing means and items of files/folders set by means of said environment setting means from said settings storing means and creating drop list window display items, drop list window display position calculating means for calculating a position where the drop list window is to be displayed, based on a starting position of the drag operation in accordance with display conditions set by means of said environment setting means, and drop list window control means for displaying the drop list window showing the drop list window display items created by said drop list window display item creating means, at the display position calculated by said drop list window display position calculating means as a foreground window.

14. The file handling device according to claim 13, wherein said drop list window display item creating means acquires items of recently accessed folders from said history storing means and items of application files and folders set by means of said environment setting means from said settings storing means if a dragged object is at least one data file, and acquires items of recently accessed folders from said history storing means and items of folders set by means of said environment setting means from said settings storing means if the dragged object is not at least one data file.

15. A computer-readable recording medium storing a file handling program for handling a file/folder in an application and in a file browser, and for handling an icon on a desktop, the program comprising:

environment setting means for setting, storing, and updating items to be displayed as menu items, the items comprising a pre-selected number of user-specified files/folders and a pre-selected number of most recently accessed file/folders;

settings storing means for storing contents of settings set by said environment setting means;

history storing means for storing a history of opened files/folders;

file menu item creation/display means, responsive to an operation to display a file menu, for acquiring the recently accessed files/folders from said history storing means and user-specified files/folders from said settings storing means, and displaying the acquired files/folders in the file menu;

file selection screen item creation/display means, responsive to an operation to select an item "Open" in the file menu, for acquiring the recently accessed files/folders from said history storing means and the user-specified files/folders from said settings storing means and displaying the acquired file/folders in a file selection screen;

folder tree item creation/display means, responsive to a depression of a "Browse" button in the file selection screen, for acquiring the recently accessed files/folders from said history storing means and the user-specified files/folders from said settings storing means and displaying the acquired files/folders in a folder tree menu;

drop list window creation/display means, responsive to a start of a drag operation, for creating and displaying a drop list window showing, as target files/folders of a drop operation, the recently accessed files/folders from said history storing means and the user-specified files/folders from said settings storing means; and file/icon menu item creation/display means, responsive to an operation to display a menu when a file/folder is selected in a file browser or an icon on a desktop is selected, for acquiring the recently accessed files/folders from said history storing means and the user-specified files/folders from said settings storing means and displaying the acquired file/folders in the menu.

16. A file handling device for handling a file/folder in an application and in a file browser, and for handling an icon on a desktop comprising:

an environment setting unit setting items to be displayed as menu items, the items comprising a pre-selected number of user-specified files/folders and a pre-selected number of most recently accessed files/folders;

a setting storing unit storing contents of settings set by the environment setting means;

a history storing unit storing a history of opened files/folders; and a file menu item creation/display unit displaying, in a file menu, the recently accessed files/folders stored in the history storing means and the user-specified files/folders stored in the settings storing means.

17. A file handling device for handling a file/folder in an application and in a file browser, and for handling an icon on a desktop comprising:

an environment setting unit setting items to be displayed as menu items, the items comprising a pre-selected number of user-specified files/folders and a pre-selected number of most recently accessed files/folders;

a setting storing unit storing contents of settings set by the environment setting means;

a history storing unit storing a history of opened files/folders; and a file selection screen item creation/display unit displaying, in a file selection screen, the recently accessed files/folders stored in the history storing means and the user-specified files/folders stored in the settings storing means.

18. A file handling device for handling a file/folder in an application and in a file browser, and for handling an icon on a desktop comprising:

an environment setting unit setting items to be displayed as menu items, the items comprising a pre-selected number of user-specified files/folders and a pre-selected number of most recently accessed files/folders;

a setting storing unit storing contents of settings set by the environment setting means;

a history storing unit storing a history of opened files/folders; and a folder tree item creation/display unit displaying, in a folder tree menu, the recently accessed files/folders stored in said history storing means and the user-specified files/folders stored in the settings storing means.

19. A file handling device for handling a file/folder in an application and in a file browser, and for handling an icon on a desktop comprising:

an environment setting unit setting items to be displayed as menu items, the items comprising a pre-selected number of user-specified files/folders and a pre-selected number of most recently accessed files/folders;

a setting storing unit storing contents of settings set by the environment setting means;

a history storing unit storing a history of opened files/folders; and a drop list window creation/display unit, responsive to a drag operation, creating and displaying a drop list window showing, as target files/folders of a drop operation, the recently accessed files/folders stored in the history storing means and the user-specified files/folders stored in the settings storing means.

20. A file handling device for handling a file/folder in an application and in a file browser, and for handling an icon on a desktop comprising:

an environment setting unit setting items to be displayed as menu items, the items comprising a pre-selected number of user-specified files/folders and a pre-selected number of most recently accessed files/folders;

a setting storing unit storing contents of settings set by the environment setting means;

a history storing unit storing a history of opened files/folders; and a file/icon menu item creation/display unit displaying, in a menu when the menu is opened upon a file/folder being selected in a file browser or an icon being selected on the desktop, the recently accessed files/folders stored in the history storing means and the user-specified files/folders stored in the settings storing means.

* * * * *